US012765514B2

(12) United States Patent
Joyce

(10) Patent No.: US 12,765,514 B2
(45) Date of Patent: Oct. 20, 2026

(54) PET MASSAGE AND GROOMING DEVICE

(71) Applicant: KIS IDEAS LLC, Avon, OH (US)

(72) Inventor: Jerome Joyce, Avon, OH (US)

(73) Assignee: KIS IDEAS LLC, Avon, OH (US)

( * ) Notice: Subject to any disclaimer, the term of this patent is extended or adjusted under 35 U.S.C. 154(b) by 8 days.

(21) Appl. No.: 18/806,823

(22) Filed: Aug. 16, 2024

(65) Prior Publication Data

US 2025/0057120 A1 Feb. 20, 2025

Related U.S. Application Data

(60) Provisional application No. 63/519,860, filed on Aug. 16, 2023.

(51) Int. Cl.
*A01K 13/00* (2006.01)

(52) U.S. Cl.
CPC .................................... *A01K 13/00* (2013.01)

(58) Field of Classification Search
CPC .... A01K 13/00; A01K 13/001; A01K 13/002; A01K 13/003
See application file for complete search history.

(56) References Cited

U.S. PATENT DOCUMENTS 5,115,765 A 5/1992 El Omary
5,462,018 A * 10/1995 Louison ............... A01K 13/001 119/626
9,961,878 B2 5/2018 Rifkin
11,559,039 B2 * 1/2023 Hoffmann .............. A01K 13/00
2006/0032458 A1 2/2006 Hutchinson et al.
2006/0287616 A1 12/2006 Nan
2007/0169720 A1 * 7/2007 Roy ......................... A46B 7/10 119/615

(Continued)

FOREIGN PATENT DOCUMENTS

CN 113632747 A 11/2021
KR 101917636 B1 * 11/2018 ........... A01K 13/001
WO 2023023081 A1 2/2023

OTHER PUBLICATIONS

Pet Life, "Pet Life Swasher Shampoo Dispensing Massage & Bathing Dog & Cat Brush", webpage, Item No. 320087, Made in China, https://www.chewy.com/pet-life-swasher-shampoo-dispensing/dp/346367?utm_source=google-product&utm_medium=organic&utm_content=Pet%20Life.

(Continued)

*Primary Examiner* — Carly W. Lynch
(74) *Attorney, Agent, or Firm* — Jacob M. Ward; Ward Law Office LLC

(57) ABSTRACT

Provided is a pet grooming device designed to enhance the grooming process. The device includes a first shell with a grooming surface featuring a hemispherical portion and various surface features such as apertures and protrusions. A second shell couples with the first to form an interior space, accommodating a cartridge for dispensing liquids like oils or conditioners through a dispensing aperture. The device is configured to vacuum as well as suction shed fur while grooming the pet, ensuring a clean grooming environment, as the device includes an elongated portion with a fluid coupling for attachment to suction or blowing sources, facilitating the removal of loose fur and debris. The ergonomic design and the inclusion of a cap provide ease of use and storage, making the grooming process more efficient and comfortable for both the pet and the user.

18 Claims, 18 Drawing Sheets

(56) References Cited

U.S. PATENT DOCUMENTS

| | | | | |
|---|---|---|---|---|
| 2010/0274162 | A1 | 10/2010 | Evans | |
| 2011/0206445 | A1 | 8/2011 | Hurwitz | |
| 2013/0292497 | A1* | 11/2013 | Allen | A01K 13/001 239/548 |
| 2016/0262346 | A1 | 9/2016 | Rifkin | |
| 2017/0265431 | A1 | 9/2017 | Urso et al. | |
| 2020/0085015 | A1* | 3/2020 | Yoo | A01K 13/00 |
| 2022/0031562 | A1 | 2/2022 | Wang et al. | |

OTHER PUBLICATIONS

Balacco Store, "Balacco Roller Ball Massager Whole Massager Cat Massager Tool Cleaning Tool for Pets Pet Massager Cleaning Ball for Pets Dogs Massage", webpage, Amazon.com, ASIN B0C16Y1GZN, Item model No. 3102361Z38.

Solacium Store, "Solacium Manual Massage Roller Ball—Massager and Therapy Tool for Sore Muscles, Shoulders, Arms, Neck, Back, Feet, Body, Deep Tissue, Stiffness, Joint Pain, Stress Relief", May 9, 2018, Item model No. S1071117, ASIN: B07CYD6JF6, Country of Origin: China, https://www.amazon.com/Manual-Massage-Roller-Ball-Shoulders/dp/B07CYD6JF6.

Chlovoe Store, "Electric Head Massager, Portable Handheld Waterproof Scalp Massager with 4 Kneading Heads and 100 Nodes for Body Relaxion & Stress Relief. Ideal Gift for Woman, Men. Dog Massage for Pets", Apr. 13, 2022, ASIN : B09XTLVMJ4, Item model No. Chlovoe-[Some_Identifier], https://www.amazon.com/Electric-Massager-Portable-Handheld-Waterproof/dp/B09XTLVMJ4.

Written Opinion of the International Searching Authority dated Nov. 7, 2024.

* cited by examiner

PET MASSAGE AND GROOMING DEVICE

CROSS-REFERENCE TO RELATED APPLICATIONS

This application claims the benefit of U.S. Provisional Application No. 63/519,860, filed on Aug. 16, 2023. The entire disclosure of the above application is incorporated herein by reference.

FIELD

The present technology relates to pet grooming devices, and, more particularly, to pet grooming and massaging devices having surface features and liquid applicators that may be integrated with a vacuum appliance for enhancing the grooming experience for pets.

INTRODUCTION

This section provides background information related to the present disclosure which is not necessarily prior art.

Pet grooming is an aspect of pet care that not only ensures the cleanliness and health of pets, particularly dogs and cats, but also strengthens the bond between pets and their owners. Massaging a pet may also have a meaningful impact on the overall mental and physical health of the pet and may allow the pet owner to be in touch with any changes of the pet body. Certain grooming tools, such as a brush or a comb, may be used to remove loose fur, untangle knots, and distribute natural oils throughout the hair of the pet. However, such tools often fail to provide an efficient and comfortable grooming experience, especially for pets with dense or long fur. What is more, these tools may not contain loose pet hair as it is removed from the pet, allowing loose hair to be scattered about, creating a messy process due to the amount of shed fur. In certain circumstances, the grooming brush or comb may also be entangled with pet hair, reducing the effectiveness of the grooming tool as well as making the grooming tool difficult to clean as the bristles become clogged with dense, matted fur. Further, these tools may also produce irritation and pain to the pet by scratching the skin and pulling on matted hair due to the difficulty in cleaning the bristles when clogged with dense, matted fur.

An additional problem with certain grooming devices is the inability to effectively manage shed fur. During the grooming process, loosened fur may become airborne or scatter around the environment, leading to cleanliness issues and potential allergic reactions among sensitive individuals. Moreover, certain grooming tools may not capture or contain the shed fur, which necessitates additional cleaning efforts post-grooming.

There are many pet grooming devices that claim a "self-cleaning" option for convenience, however, such devices may have various limitations related to required user action, mechanical reliability, potential increased manufacturing costs, and design complexity. Most importantly, certain self-cleaning mechanisms cause delay in the grooming process as they require the user to stop the grooming action while they manually press or release a button to clean the debris from the bristles.

The common use of a spray bottle to apply liquid to a pet's coat for application of grooming treatments has limitations including inconsistency in coverage. Further, using a spray bottle to apply liquid to the pet's coat may also provide the user with limited reach as it may be challenging to reach certain areas of the pet's body such as the underside of the pet and each of the legs of the pet. This also results in a lack of precise control in certain sensitive areas like the pet's face and head.

Another issue is the application of grooming treatments, such as oils and conditioners. Certain ways of applying such treatments may be uneven and wasteful. What is more, grooming treatments may be provided separately from brushing the pet using the grooming tools, thereby requiring the pet owner to maintain several different treatments, devices, and/or tools. Droppers and manual rubbing techniques may not ensure an even distribution of the treatment throughout the hair of the pet, which may lead to over-saturation in some areas and insufficient treatment in others. This may diminish the effectiveness of the grooming process and lead to skin irritation or other discomfort for the pet.

The physical design of certain grooming tools may not cater to the ergonomic needs of the user. This may result in discomfort or strain during prolonged grooming sessions. The lack of user-friendly features and adaptability to different pet sizes and fur types may make the grooming process tedious and inefficient.

There is a continuing need for an improved grooming device that captures and contains shed fur during the grooming process, allows for precise and even application of a grooming treatment, allows for a single device that is adaptable and versatile to different grooming processes and treatments, and is ergonomically designed to enhance user comfort and adaptability to various pet characteristics.

SUMMARY

In concordance with the instant disclosure, an improved grooming device that captures and contains shed fur during the grooming process, allows for precise and even application of a grooming treatment, allows for a single device that is adaptable and versatile to different grooming processes and treatments, and is ergonomically designed to enhance user comfort and adaptability to various pet characteristics, has surprisingly been discovered. The present technology includes articles of manufacture, systems, and processes that relate to the efficient grooming of pets, specifically designed to manage shed fur, apply grooming treatments evenly, and enhance user comfort during the grooming process.

In certain embodiments, a grooming device is provided. The grooming device for a pet includes a first shell including a grooming surface with a surface feature that interrupts the grooming surface. The grooming surface may be configured to contact the pet for grooming purposes. The surface feature may include protrusions, apertures, or openings, each of these surface features allowing the grooming device to massage, comb, brush, dispense a liquid to the pet, and combinations thereof to the pet during the grooming process. Additionally, a second shell is designed to couple with the first shell to form an interior space therebetween. The interior space may either house a cartridge designed to dispense a liquid from the grooming surface and or may be designed to suction shed fur through the interior space and to an external source. The grooming device facilitates the inclusion of various grooming enhancements such as a liquid dispenser or a fur capture mechanism, thereby providing a multifunctional grooming solution.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
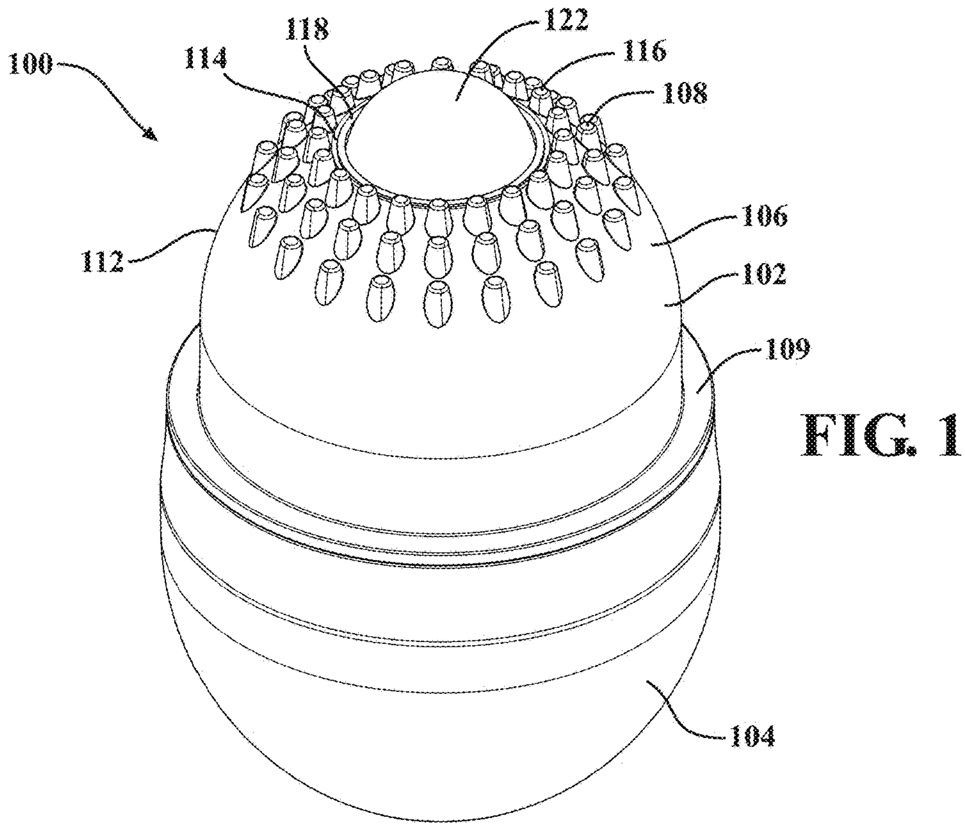
FIG. 1 is a top perspective view of a grooming device, according to an embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology improves the overall efficiency and effectiveness of pet grooming by integrating features that facilitate the capture and containment of shed fur, ensure the even distribution of grooming treatments, and reduce the physical strain on users through ergonomic design enhancements. In certain embodiments, the present technology includes a grooming device 100, 200, as shown in accompanying FIGS. 1-32. The grooming device 100, 200 incorporates a variety of features aimed at improving the grooming process. Advantageously, the grooming device 100, 200, provides an efficient tool for grooming a pet while containing shed fur and simultaneously massaging, grooming, and applying liquid/oil to the pet in an integral device. Ways of using the grooming device 100, 200 are also provided.

In certain embodiments, a grooming device 100 for a pet is provided, as shown in FIGS. 1-7. The grooming device 100 may include a first shell 102 and a second shell 104. The first shell 102 may include a grooming surface 106. The grooming surface 106 may include a surface feature 108 interrupting the grooming surface 106. The surface feature 108 may be configured to contact the pet for grooming. The second shell 104 may be configured to be coupled to the first shell 102 to form an interior space 110 therebetween. The grooming device 100 may be manufactured of plastic. Alternatively, the grooming device 100 may be manufactured of any durable material. One of ordinary skill in the art may select a suitable material to form the grooming device 100 within the scope of the present disclosure. One of ordinary skill in the art may also select different sizes or shapes of the grooming device 100 as desired to accommodate various pet sizes and grooming needs.

The first shell 102 may include the following aspects. The first shell 102 may be formed of a single piece of material configured to be coupled to the second shell 104. Alternatively, the first shell 102 may include an interior shell **102*a* configured to be disposed within the first shell 102. The interior shell 102*a* may be configured to be threadedly coupled to the first shell 102. The second shell 104 may be configured to be received by each of the first shell 102 and the interior shell 102*a*. More specifically, the second shell 104 may be received by the interior shell 102*a* via a locking means 107. The locking means 107 may be a twist-lock mechanism. Alternatively, the second shell 104 may be received by the interior shell 102*a* via other coupling means including a fastener, snap fitting, a twist-lock mechanism, an adhesive, a friction fitting, or threaded coupling. One of ordinary skill may select a suitable configuration for the first shell 102** within the scope of the present disclosure.

The first shell 102 may be substantially hemispherical in shape. The first shell 102 may also include a substantially smooth surface below the grooming surface 106. The first shell 102 may also include a first outermost diameter while the second shell 104 may include a second outermost diameter. The first outermost diameter of the first shell 102 may be less than the second outermost diameter of the second shell 104. The first shell 102 may further include a rim 109 circumscribing the first shell 102. The rim 109 and the locking means 107 may cooperate with the second shell 104 to allow the first shell 102 to be coupled to the second shell 104.

The first shell 102 may be designed with additional ergonomic features to enhance user comfort and efficiency during grooming sessions. For instance, the rim 109 may be equipped with a soft, non-slip material to provide a better grip, reducing the risk of accidental drops. The grooming surface 106 may also include textured regions or soft rubber pads to improve the handling and control of the grooming device 100 when in use. Additionally, the first shell 102 may be offered in various colors or with decorative patterns to appeal to different aesthetic preferences. The choice of materials for these enhancements, such as silicone or thermoplastic elastomers, may be determined based on factors like flexibility, durability, and ease of cleaning. One of ordinary skill in the art may also select different configurations or additions to the first shell 102 as desired to meet specific user needs or market demands.

Figure 7:
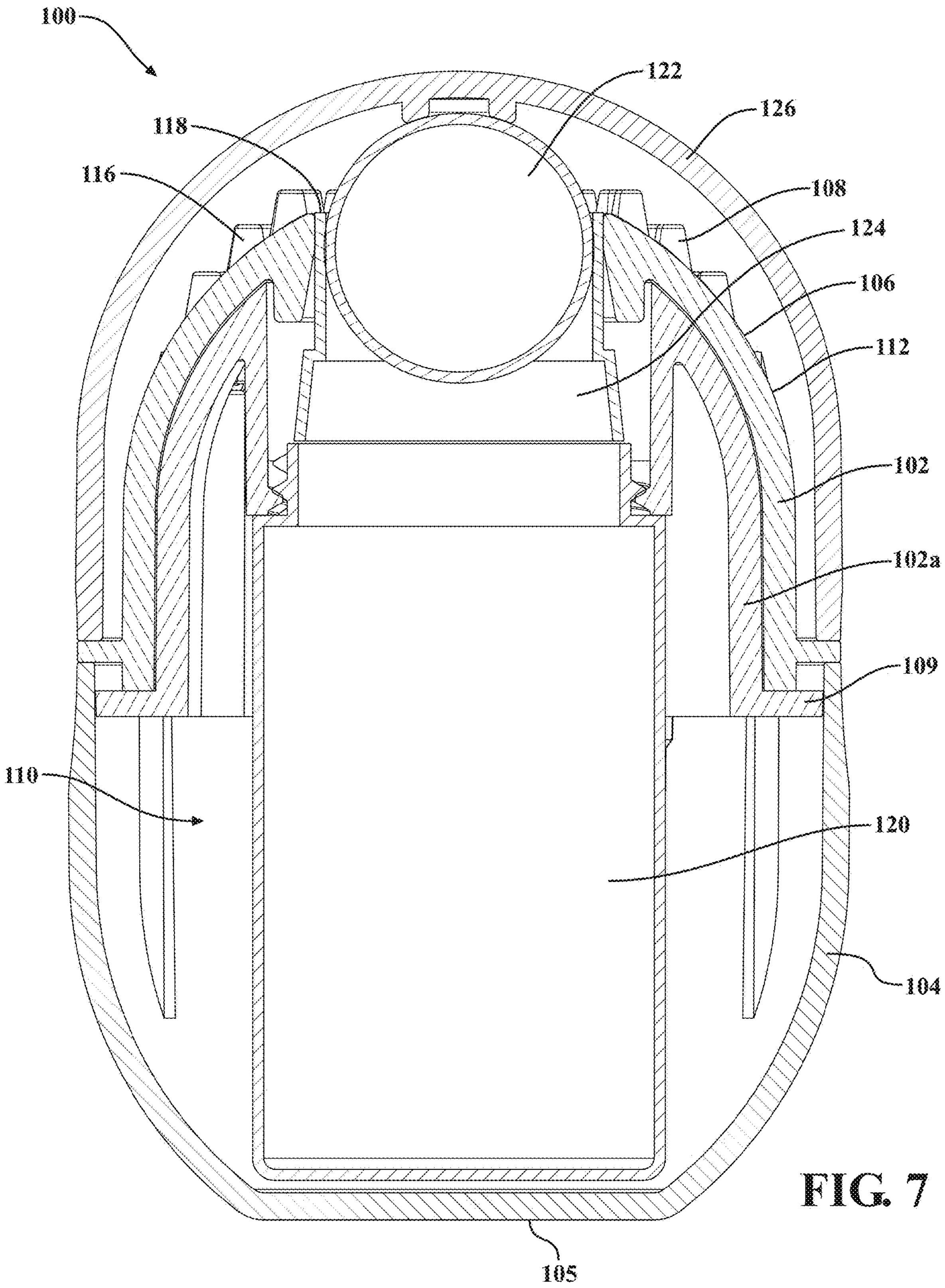
FIG. 7 is a cross sectional view of the grooming device shown in FIG. 5 taken along line A-A.

The second shell 104 may include the following aspects. The second shell 104 may be formed of a single piece of material. The second shell 104 may be configured to be threadedly coupled to the first shell 102. The second shell 104 may also be hemispherical in shape. The second shell 104 may include a substantially smooth exterior surface. More specifically, the second shell 104 may be configured to be held within a palm of a user. The second shell 104 may be sized to comfortably sit in the palm of the user and the smooth exterior surface allows the user to grip the second shell 104 during grooming of the pet. The second shell 104 may further include a base 105, as shown in FIG. 7, where the base 105 is configured to allow the grooming device 100 to sit in an upright position. The base 105 may be relatively flat. The base 105 may also be centrally disposed on the second shell 104. Advantageously, the user may place the grooming device 100 on a flat surface whereby the base 105 may position the grooming device 100 upright.

The second shell 104 may incorporate additional features that enhance its functionality and user experience. For example, the base 105 may include a non-slip material or rubberized feet to prevent the grooming device 100 from sliding or tipping over when placed on smooth surfaces when in an upright position. This stability is particularly beneficial when the device needs to be set down frequently during grooming sessions. Furthermore, the second shell 104 may be designed with integrated storage compartments for accessories such as replacement cartridges or cleaning tools, making the grooming process more convenient and efficient. The materials chosen for these features, such as high-impact plastic or composite materials, may be selected for their durability and ease of maintenance. One of ordinary skill in the art may also select additional modifications or enhancements to the second shell 104 as desired to further improve its practicality and appeal to users.

The grooming surface 106 may include the following aspects. This grooming surface 106 may be characterized by a hemispherical portion 112, enhancing the ergonomic interaction with the body contour of the pet. The grooming surface 106 may be configured to contact the body of the pet for grooming. The grooming surface 106 may include a variety of features to groom the pet, including the surface feature 108 interrupting the grooming surface 106.

The surface feature 108 may include the following aspects. The surface feature 108 is designed to interrupt the continuity of the grooming surface 106, as well as the substantially smooth exterior surface of the grooming surface 106, thereby providing functional benefits such as better massaging capabilities for the pet. The surface feature 108 may be configured to groom the pet, massage the pet, dispense a liquid onto the body of the pet, and combinations thereof. In some embodiments, the surface feature 108 includes an aperture 114. Alternatively, the surface feature 108 may include a plurality of apertures, which may aid in the distribution and application of grooming treatments. In a more particular embodiment, the aperture 114 may also be a dispensing aperture 118, as further described herein.

Figure 2:
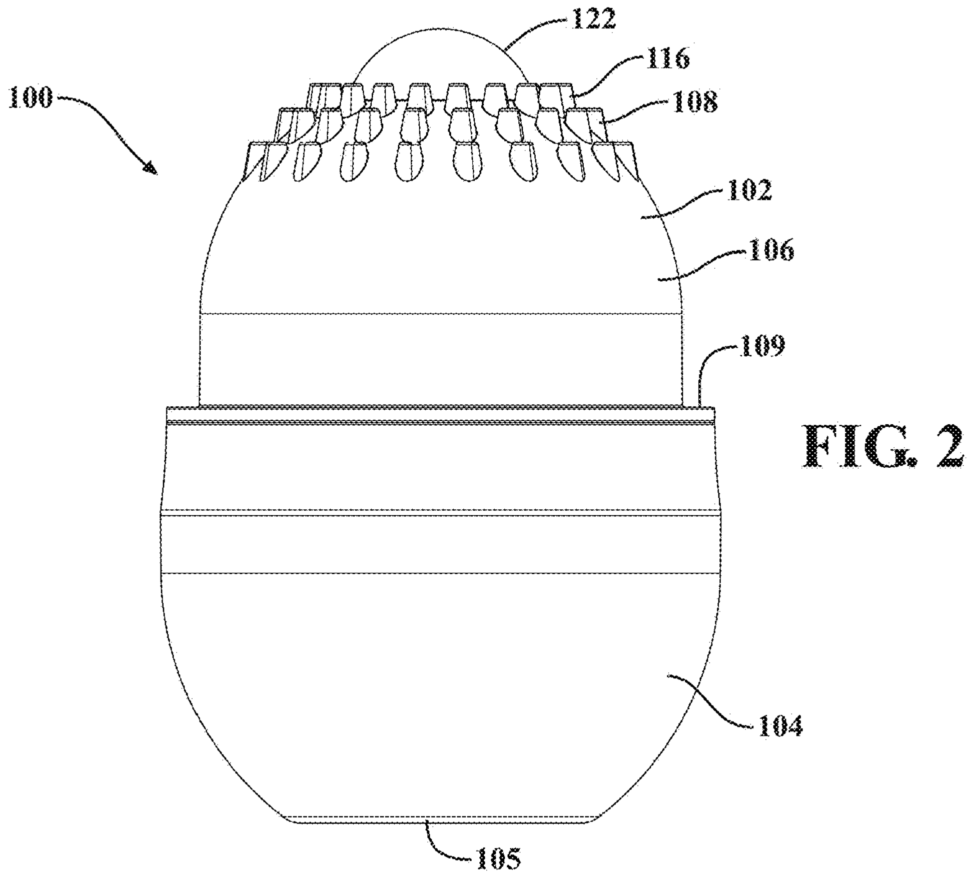
FIG. 2 is a front elevational view of the grooming device shown in FIG. 1.
Figure 3:
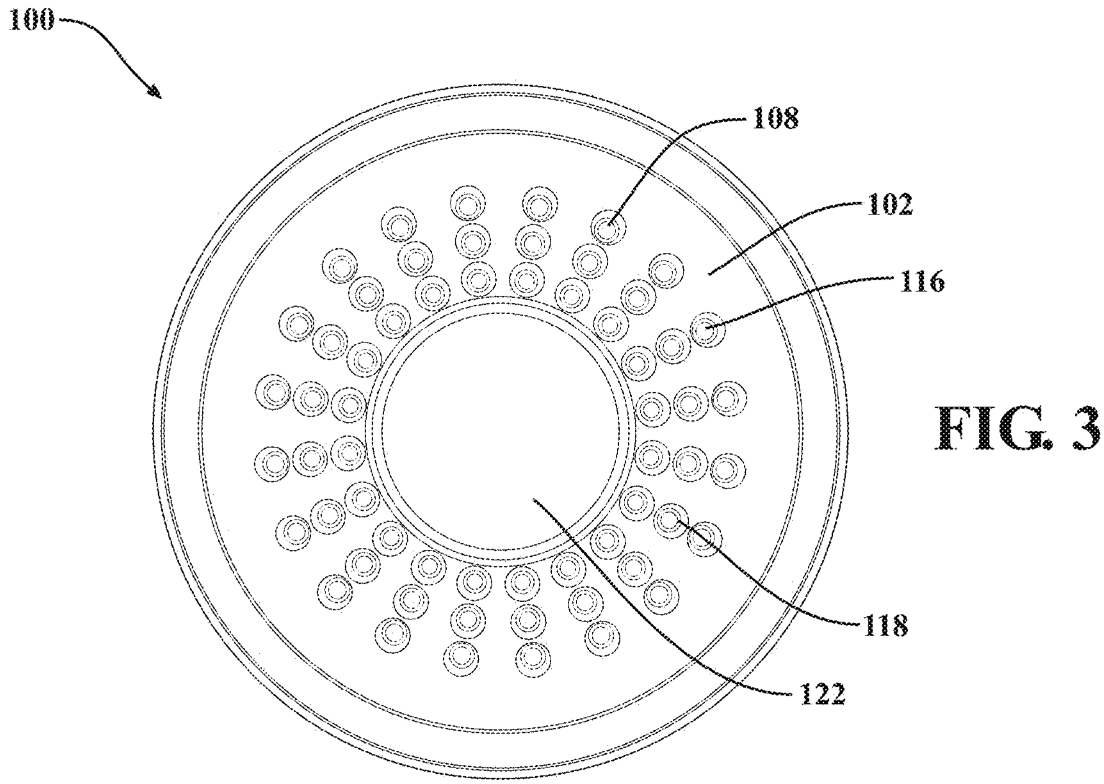
FIG. 3 is a top plan view of the grooming device shown in FIG. 1.
Figure 4:
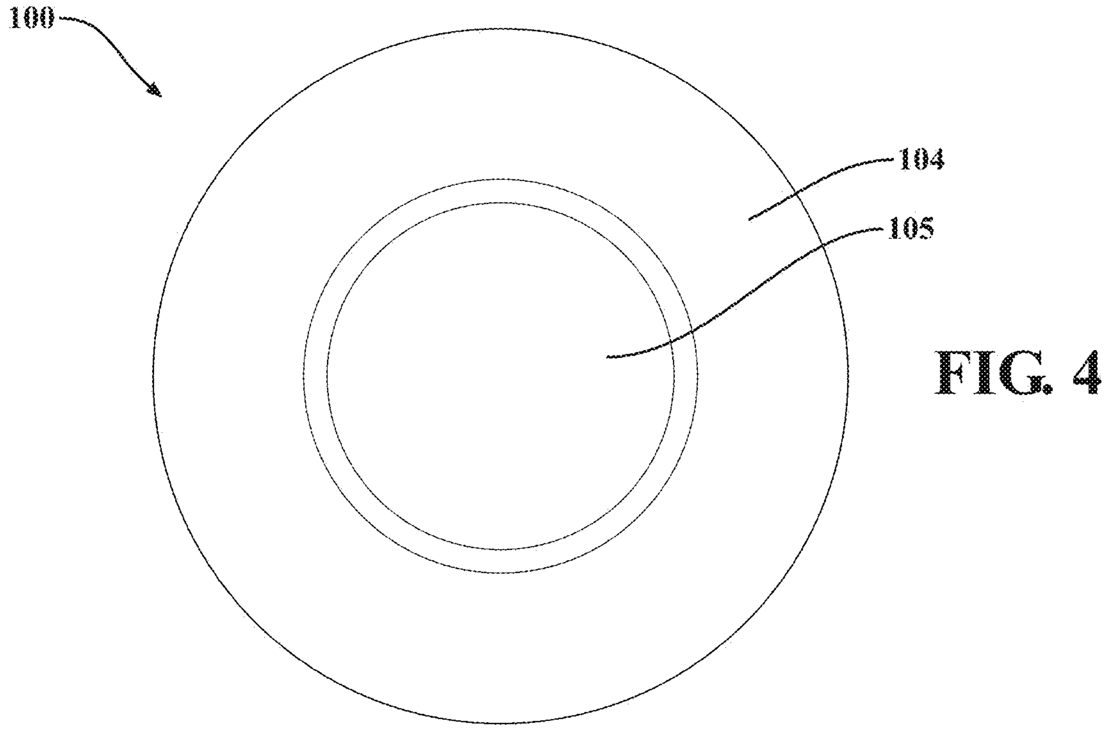
FIG. 4 is a bottom plan view of the grooming device shown in FIG. 1.
Figure 5:
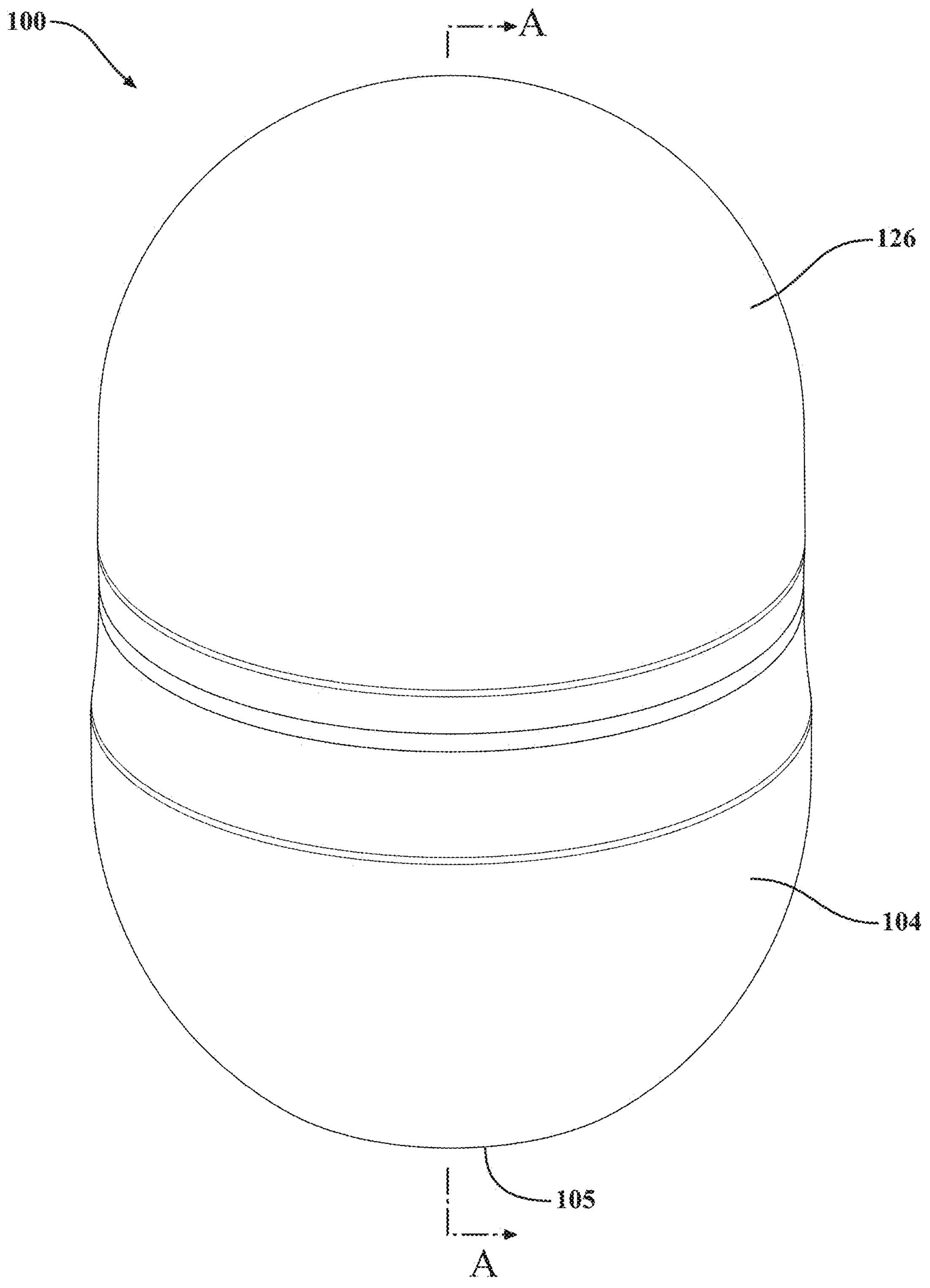
FIG. 5 is a top perspective view of the grooming device shown in FIG. 1 with a cap installed thereon.
Figure 6:
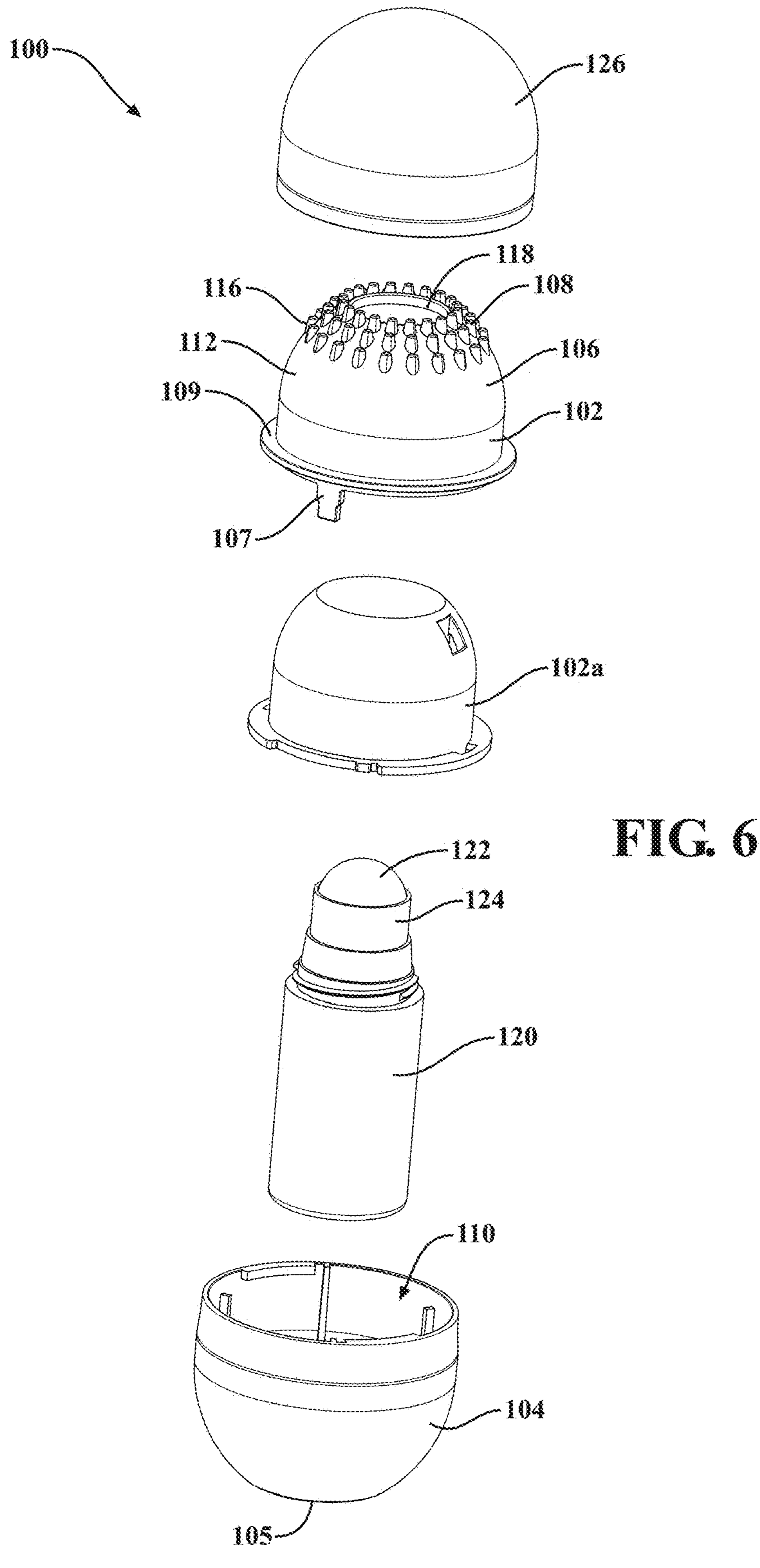
FIG. 6 is an exploded view of the grooming device shown in FIG. 5.

The surface feature 108 may include a plurality of protrusions 116. The plurality of protrusions 116 may extend from the grooming surface 106. The plurality of protrusions 116 may be oriented in a direction substantially away from the second shell 104. The plurality of protrusions 116 may further be disposed in a row or an array of rows or concentric circles on the grooming surface 106. With reference to FIGS. 1-2, the plurality of protrusions may include three rows of protrusions disposed in concentric circles. More specifically, the plurality of protrusions 116 may be configured to massage the body of the pet such that the plurality of protrusions 116 are rigid projections extending outward from the grooming surface 106. Advantageously, the plurality of protrusions 116 allows the user to massage the pet and the protrusions of the plurality of protrusions 116 may facilitate the massaging or working of a grooming treatment into the hair of the pet. The surface feature 108 may be disposed on a portion of an entirety of the grooming surface 106. Alternatively, the surface feature 108 may be arranged around at least half of the grooming surface 106. In another embodiment, the grooming surface 106 may not have the surface feature 108 such that the entirety of the grooming surface may be substantially smooth for massaging the pet. One of ordinary skill in the art may select a suitable configuration for the surface feature 108.

The surface feature 108 may also be designed with varying degrees of flexibility or softness to cater to different types of pet fur and sensitivity levels. For instance, the plurality of protrusions 116 may be made from a softer material like silicone or rubber to provide a gentler massage experience for pets with sensitive skin. Additionally, the arrangement of the plurality of protrusions 116 may be customizable, allowing users to adjust the spacing or pattern based on the grooming needs of their pet. This customization may be achieved through modular sections of the grooming surface 106 that may be rearranged or replaced as needed. The materials and configurations chosen for these features may be selected for their hypoallergenic properties and ease of cleaning. One of ordinary skill in the art may also select other modifications or enhancements to the surface feature 108 as desired to optimize the grooming experience for different pet breeds and conditions.

The surface feature 108 may further include a dispensing aperture 118. The dispensing aperture 118 may be disposed through the first shell 102. The dispensing aperture 118 may be centrally disposed through the grooming surface 106. Additionally, the dispensing aperture 118 may be centrally disposed relative to the plurality of protrusions 116 such that the plurality of protrusions 116 may circumscribe the dispensing aperture 118, as shown in FIGS. 1-2. The plurality of protrusions 116 may surround an entirety of the dispensing aperture 118.

The second shell 104 may be configured to couple with the first shell 102 to form an interior space 110 between. The interior space 110 may house one or more additional components such as a cartridge 120. The interior space 110 allows the cartridge 120 to be securely disposed within the interior space 110. The cartridge 120 may be designed to dispense a liquid, including a grooming treatment such as a lotion or oil, through the dispensing aperture 118 located on the grooming surface 106. The cartridge 120 may be configured to release the liquid through a rollerball 122. One of ordinary skill in the art may select a suitable rollerball 122 device to release the liquid from the dispensing aperture 118 of the grooming device 100 within the scope of the present disclosure. Alternatively, the cartridge 120 may be configured to release the liquid through one of a dauber or a pressure-sensitive valve. Advantageously, the rollerball 122, dauber, and pressure-sensitive valve may each provide for controlled release of the liquid from the cartridge 120 and ensure that the liquid is applied evenly and in measured amounts.

The interior space 110 may be further configured to accommodate multiple cartridges 120 simultaneously, allowing for the use of various grooming treatments during a single grooming session. This may include cartridges 120 with different types of liquids such as shampoos, conditioners, or flea treatments, which may be selected and switched easily according to the grooming needs. The design of the cartridge 120 may feature interchangeable tops with different dispensing mechanisms, such as varying sizes of the rollerball 122 or dauber, to adjust the flow rate and spread of the liquid based on the type of treatment and the fur density of the pet. The materials used for these cartridges 120 may be chosen for compatibility with different liquids and durability to withstand regular use. One of ordinary skill in the art may also select other configurations or enhancements to the interior space 110 and cartridges 120 as desired to further improve the versatility and effectiveness of the grooming device 100.

The rollerball 122, as shown in FIG. 1, may be disposed therethrough the dispensing aperture 118, allowing the liquid to dispense from the dispensing aperture 118. The rollerball 122 may be disposed through each of the first shell 102 and the second shell 104 where the cartridge 120 of the rollerball 122 is disposed in an upright position within the second shell 104. The cartridge 120 may also include a liquid dispensing head 124 that may be configured to be disposed in the dispensing aperture 118. Particularly, the cartridge 120 may be positioned in an upright position in the second shell 104 and the liquid dispensing head 124 may be disposed therethrough the dispensing aperture 118. The liquid dispensing head 124 may be a rollerball head, for example. The liquid dispensing head 124 may provide controlled release of the liquid from the dispensing aperture 118. The liquid dispensing head 124 of the rollerball 122 may be connected to the cartridge 120 holding the liquid. The rollerball 122 may be a refillable rollerball, allowing the user to refill the cartridge 120. Further, the rollerball 122 may be a stainless steel rollerball for fragrances and essential oils. One of ordinary skill in the art may select a suitable rollerball 122 within the scope of the present disclosure.

The rollerball 122 may further include a rollerball cap (not pictured), in a particular embodiment. The rollerball cap may be configured to be removably disposed atop the rollerball 122 when the rollerball 122 is not in use. Advantageously, the rollerball cap may keep the surrounding area clean and militate against spillage of the content of the cartridge 120 through the rollerball 122. One of ordinary skill in the art may select a suitable rollerball cap within the scope of the present disclosure. A cap may also be employed to cover the liquid dispensing head 124 when configured with a dauber or pressure-sensitive valve.

The cartridge 120 may also include a dauber. The dauber may include a liquid permeable pad, designed to allow a slow and controlled release of the liquid or oil from the cartridge 120. The dauber works by absorbing the grooming liquid from the cartridge 120 and then gradually dispensing the liquid through the permeable pad as the permeable pad contacts the pet body, ensuring an even and efficient application. Non-limiting examples of such a dauber may include pads made from various absorbent materials such as felt, sponge, or a soft fabric, each selected for its ability to release liquids at different rates suitable for various grooming needs. For instance, a felt pad may be used for thicker liquids like conditioners, providing a slower release, while a sponge may be better suited for more fluid solutions, allowing a quicker transfer to the fur of the pet. This design ensures that the grooming process is not only effective but also adaptable to different types of grooming treatments and pet fur conditions.

Alternatively, the cartridge 120 may be a pressure-sensitive valve. The pressure-sensitive valve may facilitate the release of the liquid from the cartridge 120 when pressed against the pet body. The valve operates by responding to the pressure exerted during the grooming process. As the pressure-sensitive value is pressed against the pet, the valve opens to allow the liquid to flow out, and the valve closes when the pressure is released, preventing unwanted leakage. Non-limiting examples of such a pressure-sensitive valve may include a spring-loaded valve that requires a specific amount of force to open, or a flexible diaphragm that deforms under pressure to release the liquid. These mechanisms may be finely tuned to different pressure levels, accommodating pets of various sizes and sensitivities. For instance, a lighter pressure activation may be used for smaller or more sensitive pets to ensure comfort, while a sturdier setup may be necessary for larger breeds with denser fur, ensuring adequate liquid application during grooming. This design enhances the precision and efficiency of liquid application, making the grooming process smoother and more controlled.

In certain embodiments, the surface feature 108 may include where the dispensing aperture 118 is disposed through the first shell 102 and the dispensing aperture 118 may be configured to dispense the liquid. More specifically, the interior space 110 between each of the first shell 102 and the second shell 104 may house the liquid and allow the dispensing aperture 118 to dispense the liquid. Advantageously, this militates against the need to utilize a cartridge, as the interior space 110 within the first shell 102 and the second shell 104 may house the liquid instead. One of ordinary skill in the art may select a suitable configuration for dispensing the liquid within the scope of the present disclosure.

The grooming device 100 may further include the following aspects. The grooming device 100 may further include a cap 126. The cap 126 may be designed to cover at least a portion of the first shell 102. The cap 126 may be removably coupled to the second shell 104. Advantageously, the cap 126 aids in maintaining the cleanliness of the grooming surface 106 when the grooming device 100 is not in use. With reference to FIG. 2, the second shell 104 may be relatively larger than the first shell 102 to accommodate the first shell 102 and the cap 126. The second outermost diameter of the second shell 104 may be greater than the first outermost diameter of the first shell 102. In particular, this configuration allows the cap 126 to couple to the second shell 104 to encapsulate the first shell 102. When the cap 126 is coupled to the second shell 104, the outermost diameter of the cap 126 may be substantially similar to the second outermost diameter of the second shell 104.

In addition, the cap 126 may include with a locking mechanism to secure the cap 126 to the second shell 104, ensuring that the cap 126 remains attached during storage or transport. The locking mechanism may be a simple twist-lock, a snap-fit, or a magnetic closure, depending on design preferences and specific requirements for security and ease of use. The cap 126 may also include a transparent window or section allowing visibility of the grooming surface 106, which may be useful for quickly identifying the grooming surface 106 and assessing the condition of the grooming surface 106 without removing the cap 126. The materials used for the cap 126 may include impact-resistant plastics or composites, which may be selected for their durability and protective qualities. One of ordinary skill in the art may also select other modifications or enhancements to the cap 126 as desired to further improve its functionality and integration with the overall design of the grooming device 100.

In certain embodiments, a grooming device 200 for a pet is provided, as shown in FIGS. 8-32. The grooming device 200 may include a first shell 202 and a second shell 204. The first shell 202 may include a grooming surface 206. The grooming surface 206 may include a surface feature 208 interrupting the grooming surface 206. The surface feature 208 may be configured to contact the pet for grooming. The second shell 204 may be configured to be coupled to the first shell 202 to form an interior space 210 therebetween.

Figure 10:
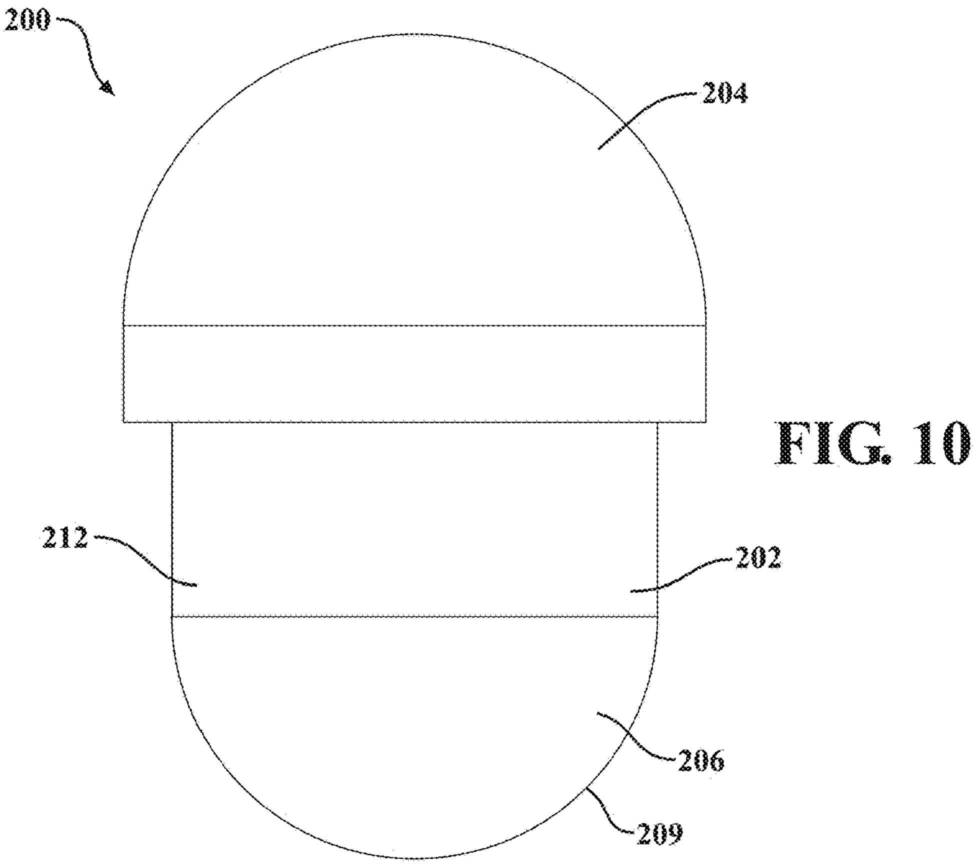
FIG. 10 is a left side-elevational view of the grooming device shown in FIG. 8.
Figure 11:
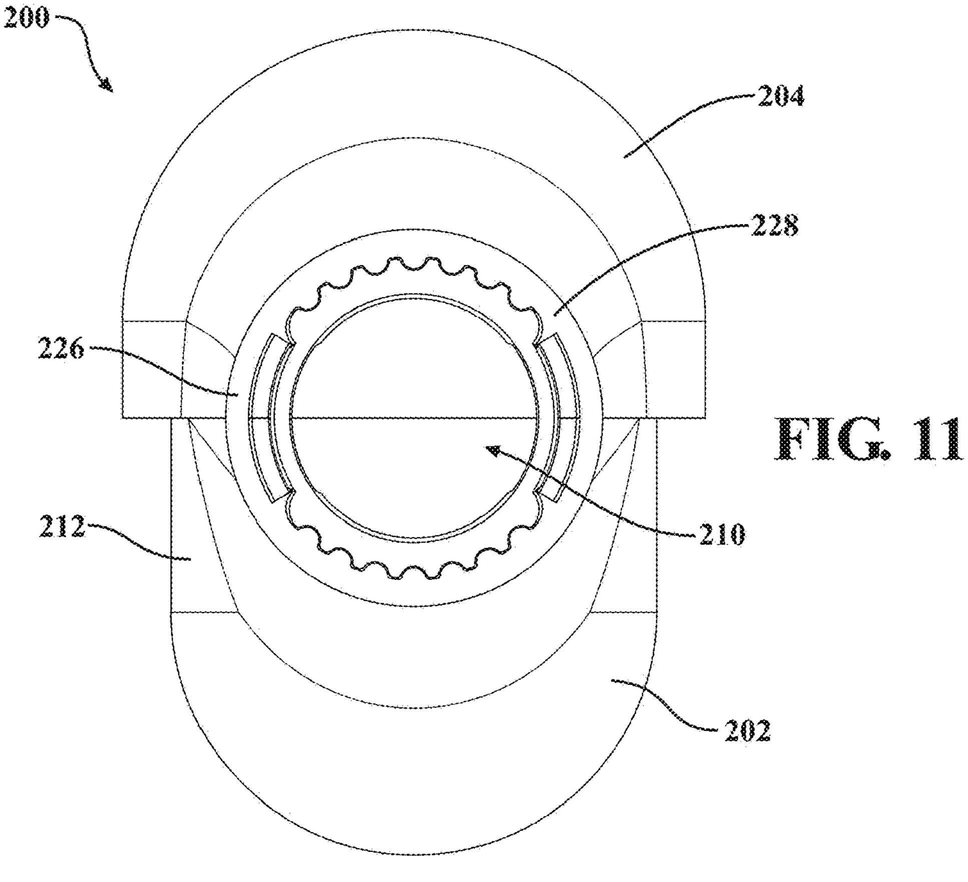
FIG. 11 is a right-side elevational view of the grooming device shown in FIG. 8.
Figure 12:
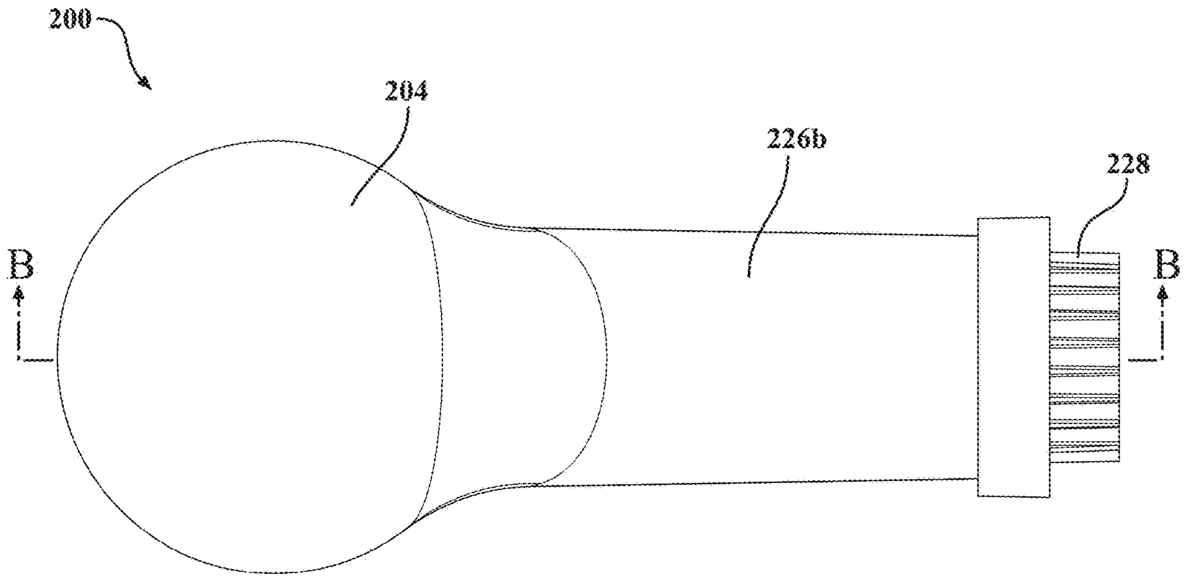
FIG. 12 is a top plan view of the grooming device shown in FIG. 8.

With reference to FIG. 10, the second shell 204 may be relatively larger than the first shell 202. More specifically, the diameter of the second shell 204 may be greater than the diameter of the first shell 202. The first shell 202 may include a first maximum diameter. The second shell 204 may include a second maximum diameter. The second maximum diameter may be larger than the first maximum diameter. Alternatively, in other embodiments, the second maximum diameter may be less than the first maximum diameter. One of ordinary skill in the art may select a suitable configuration for the first shell 202 and the second shell 204 within the scope of the present disclosure. However, the difference in diameter between the first shell 202 and the second shell 204 provides a gap 230, as further described herein.

Figure 9:
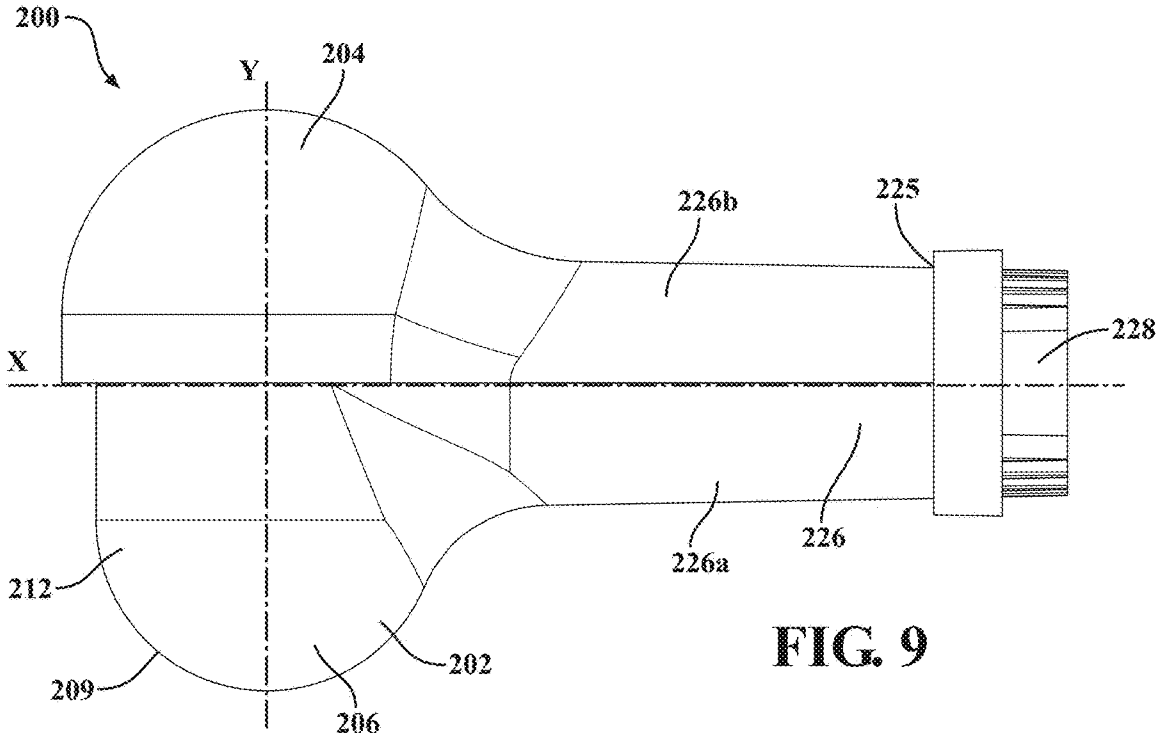
FIG. 9 is a front elevational view of the grooming device shown in FIG. 8.

The first shell 202 and the second shell 204 may include the following aspects. One or both of the first shell 202 and the second shell 204 may include an elongated portion 226. The first shell 202 may include a first elongated portion 226*a* and the second shell 204 may include a second elongated portion 226*b*. The elongated portions 226*a*, 226*b* may extend from each of the first shell 202 and the second shell 204. Specifically, the first elongated portion 226*a* may extend from the first shell 202. The second elongated portion 226*b* may extend from the second shell 204. The first elongated portion 226*a* may also be coextensive with the second elongated portion 226*b*. Each of the first elongated portion 226*a* and the second elongated portion 226*b* may be configured to couple to one another to form the elongated portion 226. Advantageously, the elongated portion 226 may be provided as a handle-like structure for the user during the grooming process. The elongated portion 226 allows the user to comfortably hold the grooming device 200 around the second shell 204 in an ergonomic position that reduces strain to the hand of the user. An axis (X) of the elongated portion 226 may run orthogonal to an axis (Y) in which the grooming surface 206 projects from the first shell 202, as shown in FIG. 9.

The elongated portion 226 may also be hollow and may be in fluid communication with a portion of the interior space 210. The elongated portion 226 may include a fluid coupling 228 at a distal end 225 of the elongated portion 226. The fluid coupling 228 may be configured to fluidly couple to an external source 201, such as a suction source or a blowing source. More specifically, the fluid coupling 228 may be fluidly coupled to a vacuum source, as a non-limiting example. The fluid coupling 228 may also include a ribbed outer surface to aid with grip. The fluid coupling 228 may be of any size to accommodate various suction sources or blowing sources, including flexible hoses, tubes, conduits fluidly coupled thereto. Advantageously, the fluid coupling 228 is particularly useful for coupling to the suction source or blowing source for removing loose fur and debris during use, as well as maintaining a clean environment during the grooming process. The hollow elongated portion 226 facilitates the movement of shed fur through the grooming device 200 and to the suction source in conjunction with other features, as further described herein. The hollow elongated portion 226 also allows the blowing source to transfer air through the elongated portion 226 and out of the second shell 204, in conjunction with other features as further described herein. One of ordinary skill may select a suitable suction source or blowing source to couple to the grooming device 200 via the fluid coupling 228 within the scope of the present disclosure.

The design of the fluid coupling 228 may be adapted to include interchangeable adapters or connectors that allow for compatibility with a wider range of external sources 201, such as different models of vacuum cleaners or air blowers. In certain embodiments, the external source 201 may also use a commercially available vacuum appliance which may be coupled to the grooming device 200 via the fluid coupling 228. This flexibility may enable users to easily connect the grooming device 200 to the equipment they already own, enhancing convenience and usability. The fluid coupling 228 may also incorporate a valve or gate mechanism to control the flow of air or suction, providing users with the ability to adjust the intensity of the suction or blowing action according to the grooming needs and comfort of the pet. Materials for the fluid coupling 228 and the elongated portion 226 may be chosen for durability and resistance to wear, ensuring long-lasting performance even with frequent connections and disconnections. One of ordinary skill in the art may also select other enhancements or modifications to the fluid coupling 228 and elongated portion 226 as desired to optimize the functionality and user-friendliness of the grooming device 200.

Figure 8:
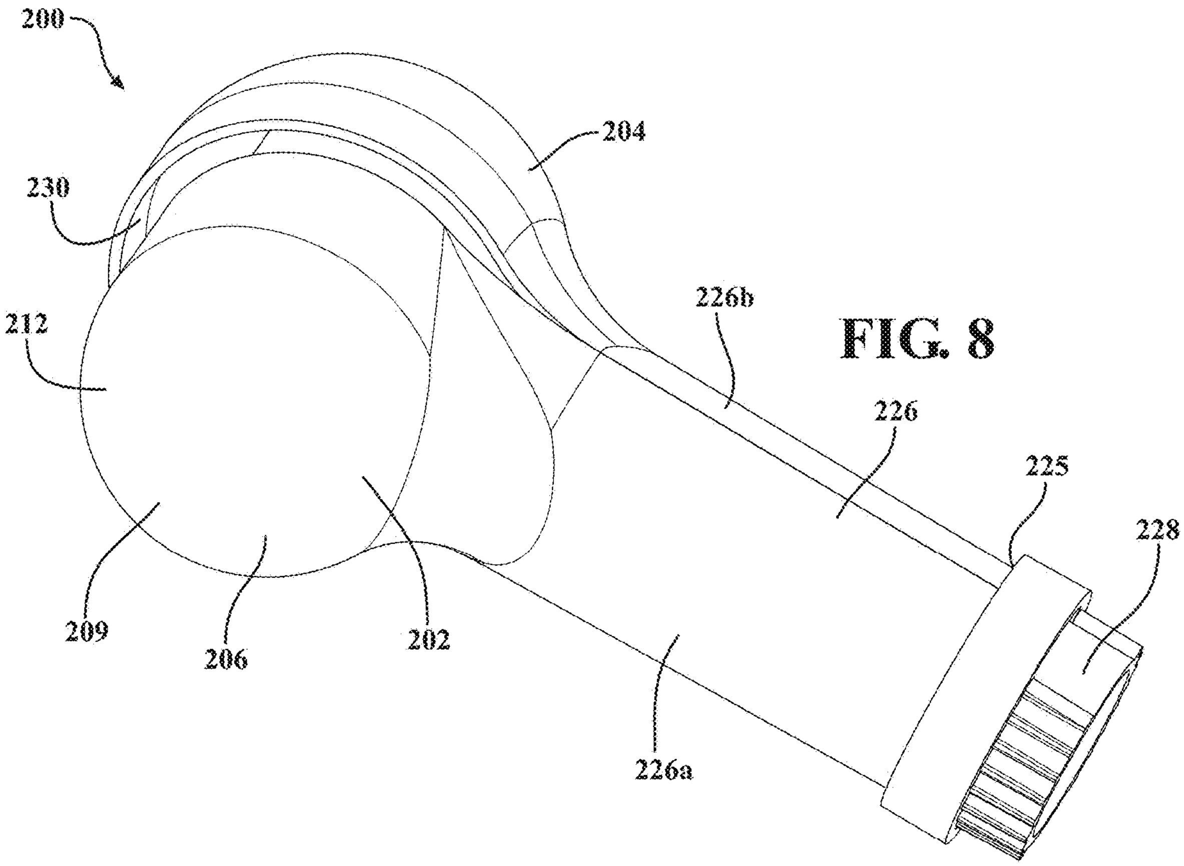
FIG. 8 is a bottom perspective view of a grooming device, according to another embodiment of the present disclosure.
Figure 13:
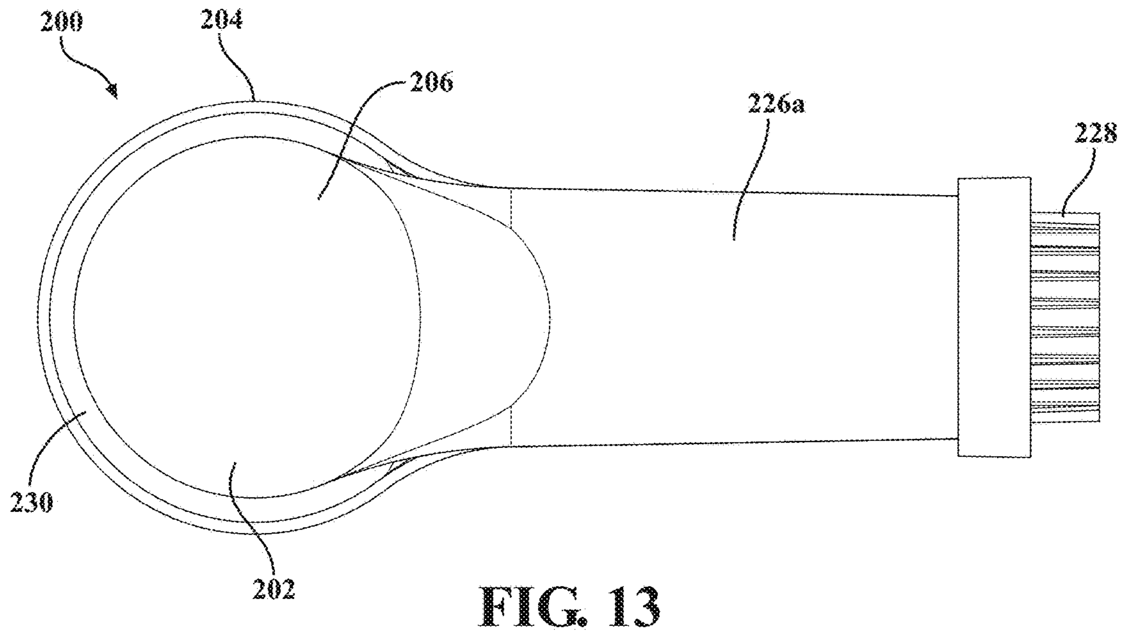
FIG. 13 is a bottom plan view of the grooming device shown in FIG. 8.
Figure 14:
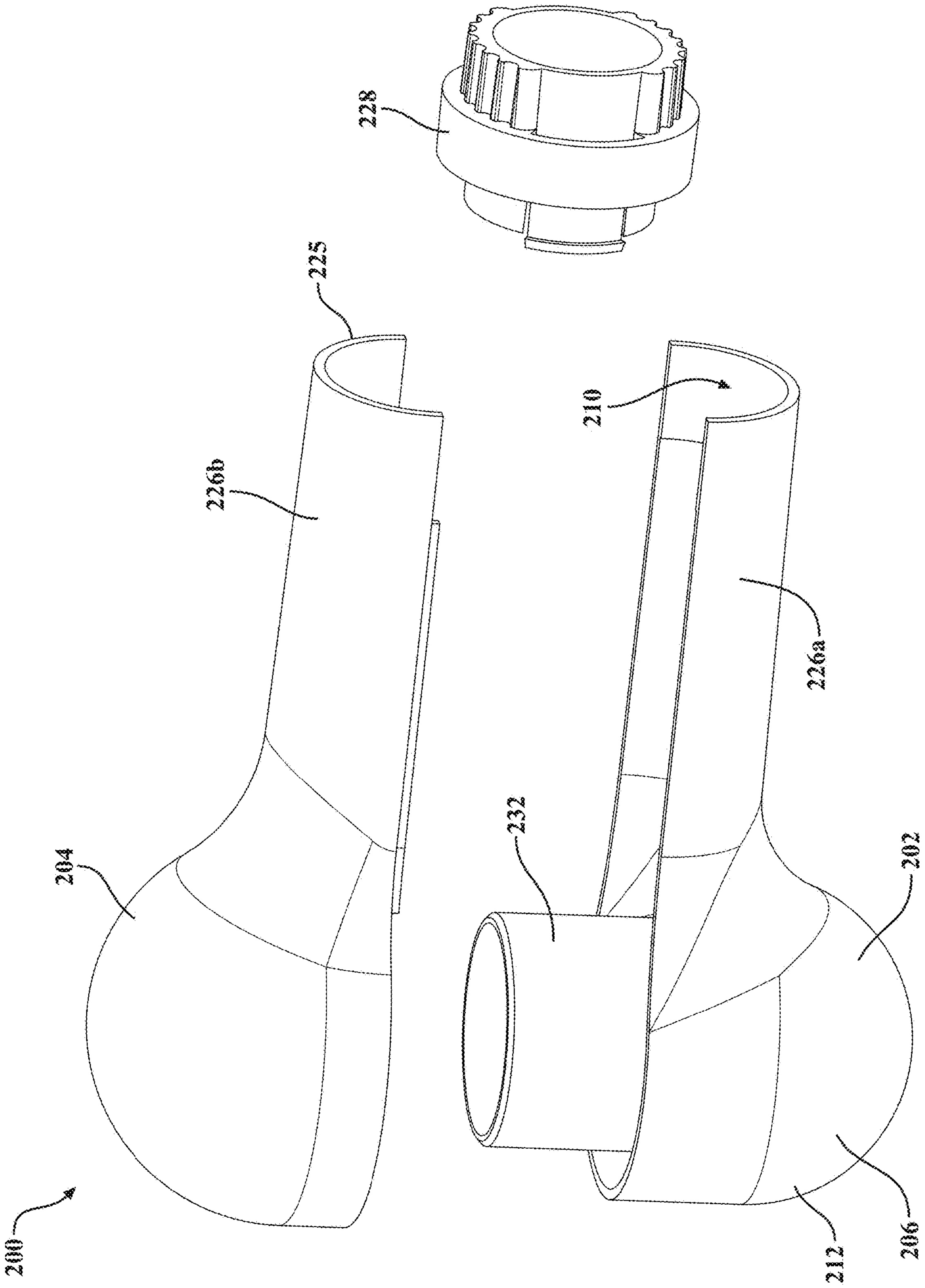
FIG. 14 is an exploded view of the grooming device shown in FIG. 8.
Figure 15:
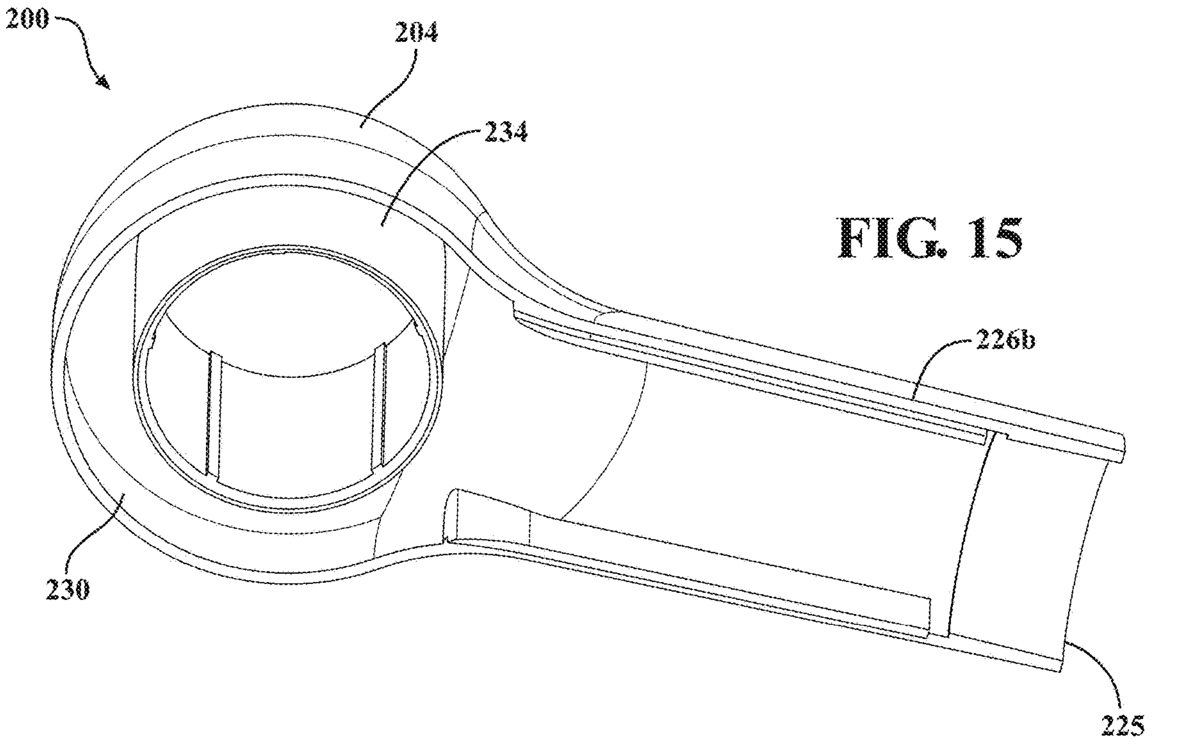
FIG. 15 is a perspective view of the second shell of the grooming device shown in FIG. 8
Figure 16:
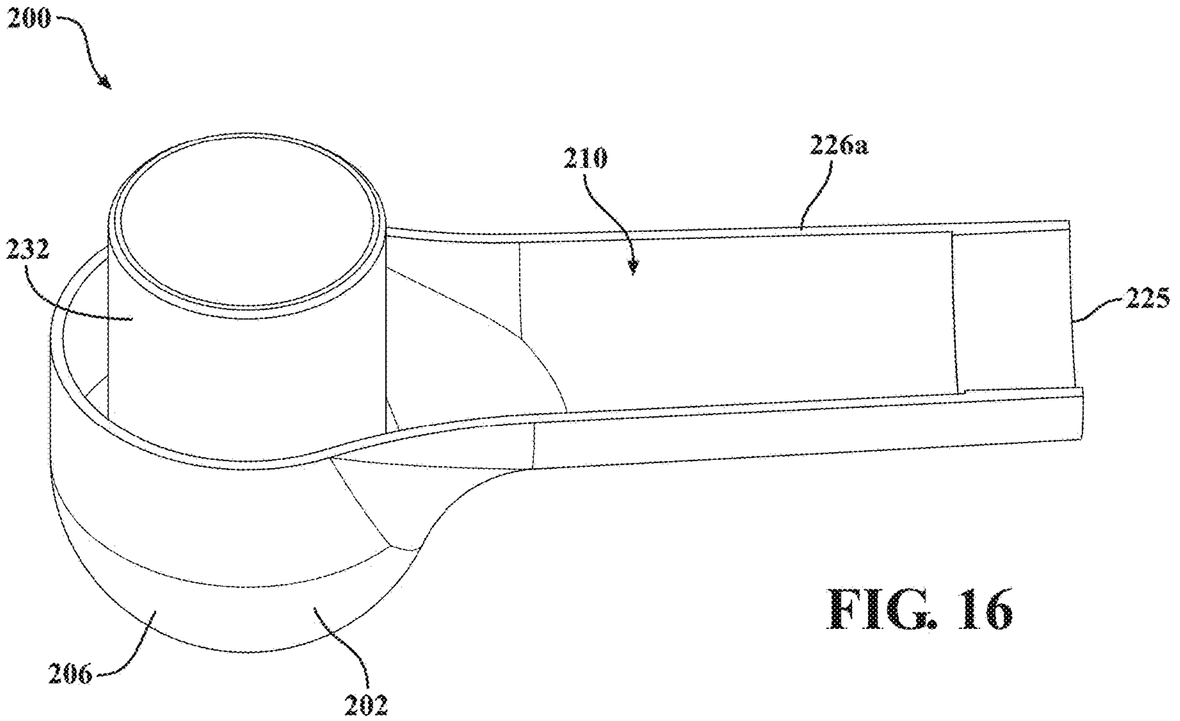
FIG. 16 is a perspective view of the first shell of the grooming device shown in FIG. 8.
Figure 17:
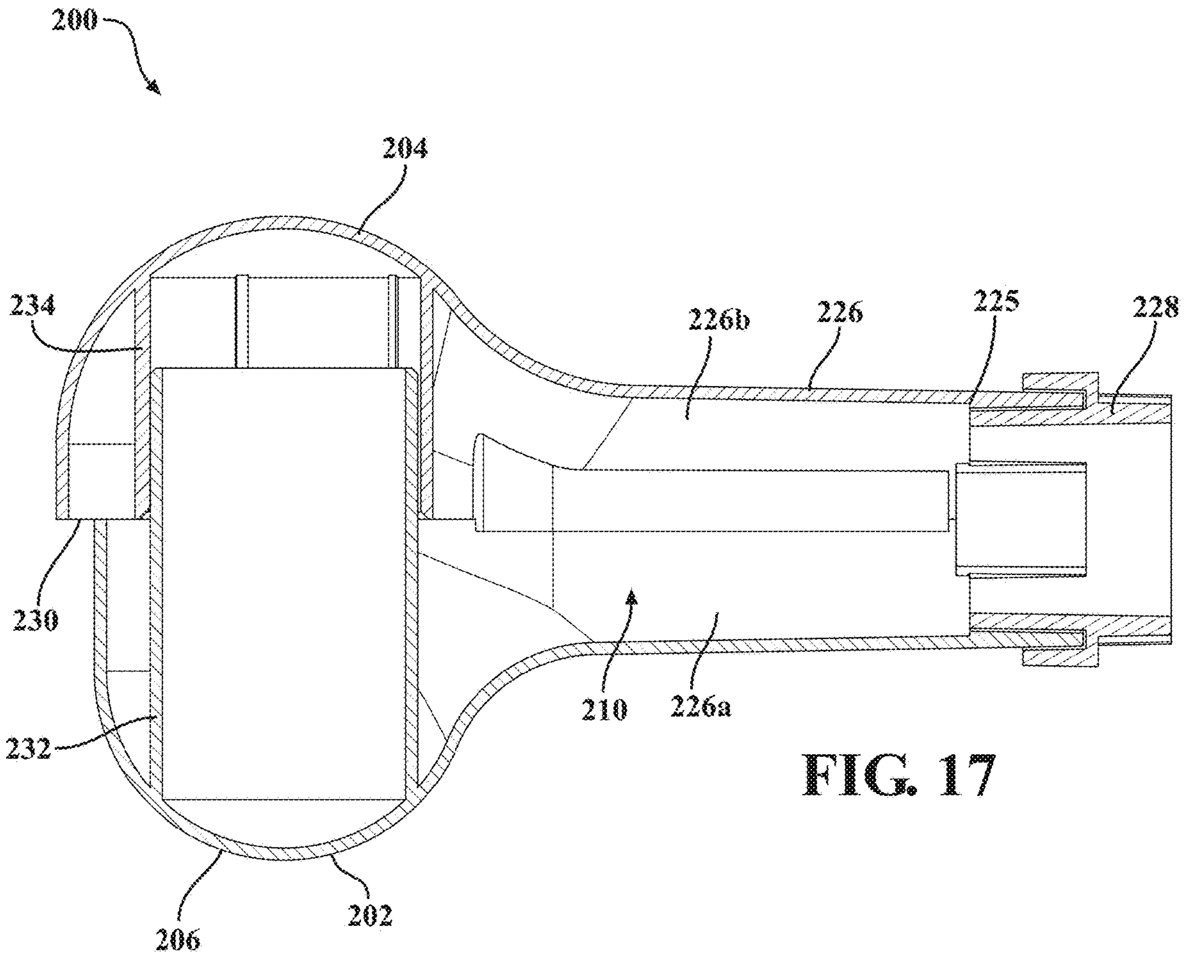
FIG. 17 is a cross sectional view of the grooming device shown in FIG. 12 taken along line B-B.
Figure 18:
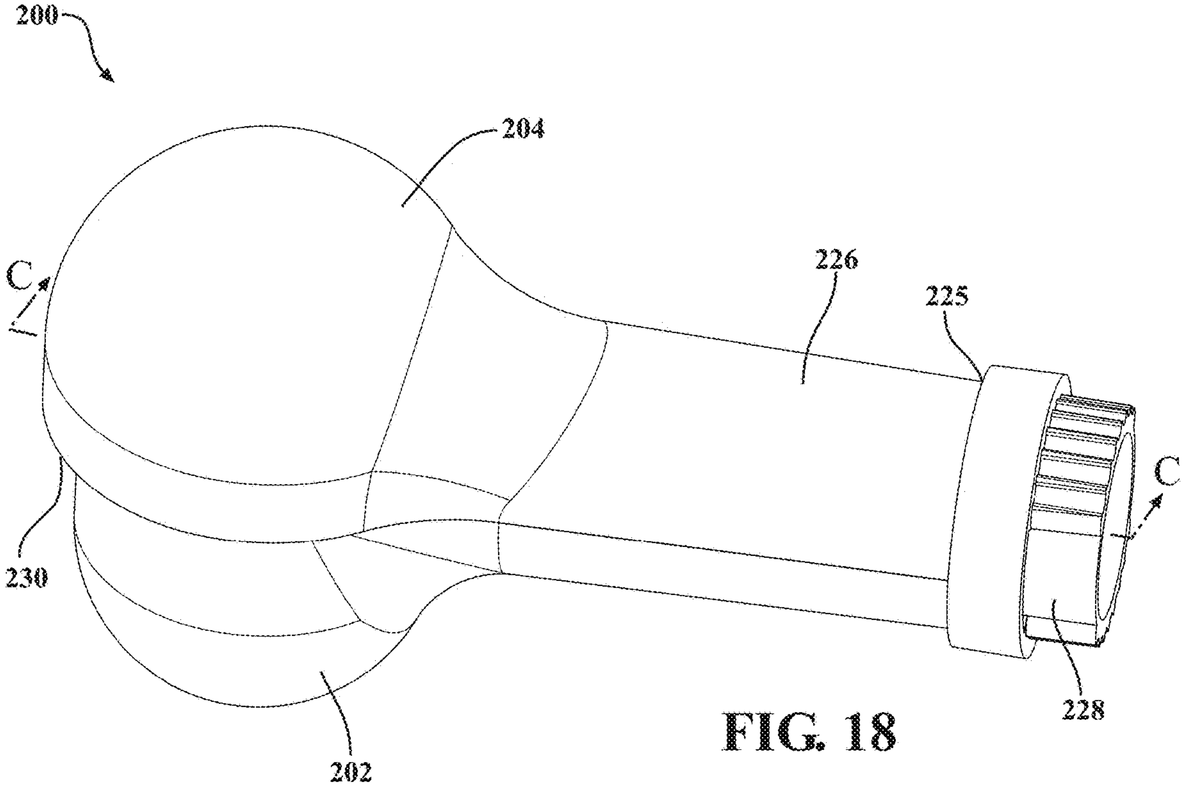
FIG. 18 is a top perspective view of a grooming device, according to another embodiment of the present disclosure.
Figure 19:
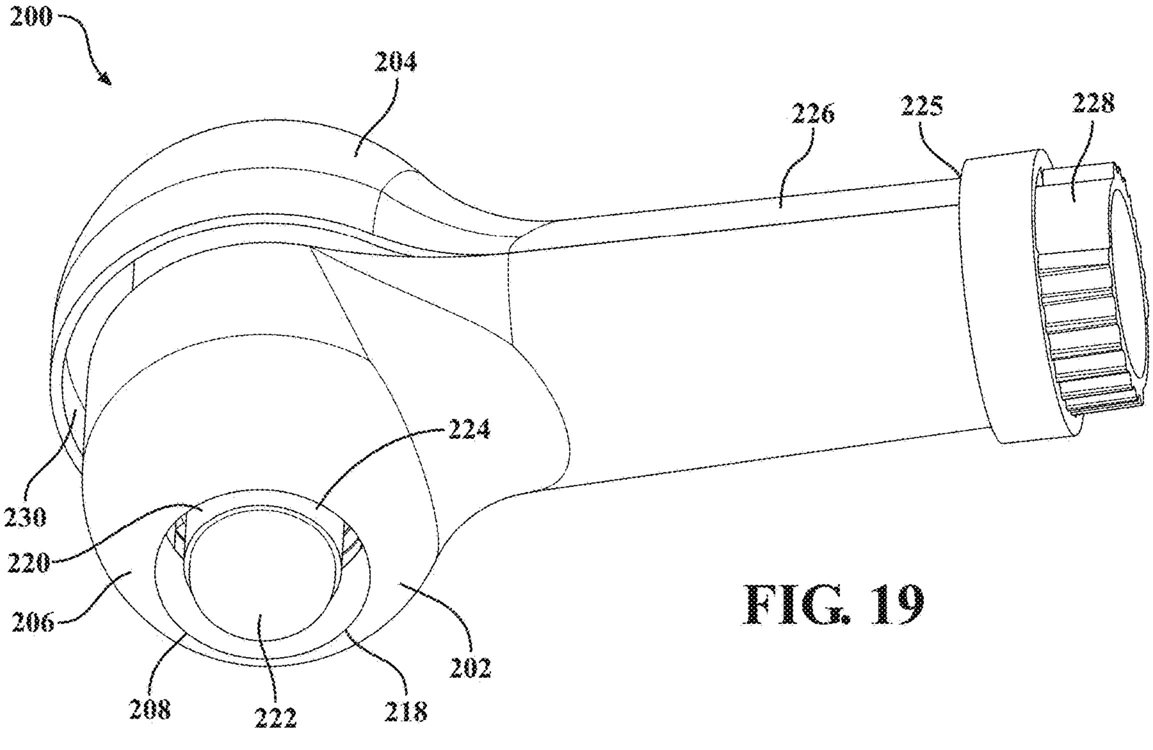
FIG. 19 is a bottom perspective view of the grooming device shown in FIG. 18.

The coupling of the first shell 102 with the second shell 104 may also form the gap 230 surrounding a portion of the first shell 102, as shown in FIGS. 8 & 13. The gap 230 may be configured to be fluidly coupled to the fluid coupling 228 through the interior space 210 and the hollow elongated portion 226, enhancing the ability of the grooming device 200 to manage shed fur from the pet. The gap 230 may be configured to direct the shed fur through the interior space 210 of the grooming device 100 when in use with a suction source. The gap 230 may be defined by an overhang of the second shell 104 relative to the first shell 202. The gap 230 may be arranged around at least half of the grooming surface 106, providing ample space for air flow and fur capture. The gap 230 may also be arranged around at least half of the first shell 202.

To further enhance the functionality of the gap 230, additional features such as removable sections could be incorporated to allow for the customization of the gap 230 size based on the type of fur or the amount of shedding. This adjustability may help optimize airflow and fur capture for different breeds and conditions, making the grooming process more efficient. Moreover, the connecting of the first shell 202 and the second shell 204 may maintain a tight seal ensuring that the integrity of the fluid coupling 228 with the air flow is preserved. One of ordinary skill in the art may also select other modifications or enhancements to the gap 230 as desired to further improve the effectiveness in capturing and managing shed fur during grooming sessions.

With reference now to FIGS. 14-17, and 20-21, the first shell 202 may further include a first interior cylindrical portion 232, and the second shell 204 may include a second interior cylindrical portion 234. Each of the first interior cylindrical portion 232 and the second interior cylindrical portion 234 is configured to couple to the other when the second shell 104 is coupled to the first shell 102, providing structural integrity and alignment of the internal components. The first interior cylindrical portion 232 may be configured to hold a portion of a cartridge 220, while the second interior cylindrical portion 234 may hold another portion of the cartridge 220. The cartridge 220 may be a rollerball 222, for example, having a liquid dispensing head 224 disposed therethrough the first shell 202. More specifically, the first interior cylindrical portion 232 of the first shell 202 may be configured to be received by the second interior cylindrical portion 234 of the second shell 204. Advantageously, the first interior cylindrical portion 232 and the second interior cylindrical portion 234 ensure that the cartridge 220 is securely positioned within the interior space 210, optimizing the dispensing of a grooming liquid.

The rollerball 222 may additionally include a rollerball cap (not pictured), in a particular embodiment. The rollerball cap may be configured to be removably disposed atop the rollerball 222 when the rollerball 222 is not in use. More specifically, the rollerball cap may be configured to be removably coupled to the liquid dispensing head 224 to enclose a portion of the rollerball 222 within the rollerball cap. Alternatively, the rollerball cap may be removably coupled to the dispensing aperture 218 to contain the rollerball 222 within the rollerball cap. The rollerball cap may further be removably coupled to the first shell 202 to cover the rollerball 222 when not in use. Advantageously, the rollerball cap may keep the surrounding area clean and militate against spillage of the content of the cartridge 220 through the rollerball 222. One of ordinary skill in the art may select a suitable rollerball cap and a suitable configuration for the rollerball cap within the scope of the present disclosure.

The first interior cylindrical portion 232 and the second interior cylindrical portion 234 may be further configured with modular features that allow for easy replacement or interchangeability of the cartridge 220, including a quick-release mechanism that facilitates the swapping of cartridges, enabling users to change between different types of grooming liquids without hassle. The design may also incorporate seals or gaskets to prevent leakage of liquids, ensuring that the dispensing system remains clean and efficient, as well as isolated from the air flow of the external source 201. One of ordinary skill in the art may also select other enhancements or modifications to the first interior cylindrical portion 232 and the second interior cylindrical portion 234 as desired to further refine the precision and usability of the grooming device 200.

The grooming surface 206 may include the following aspects. The grooming surface 206 of the grooming device 200 may be substantially uninterrupted and smooth and may function as a massaging surface for the pet during the grooming device. The entirety of the grooming surface 206 may be solid, as shown in FIGS. 8 and 13, whereby the surface does not include any openings, protrusions, or other features interrupting the grooming surface 206. More specifically, this allows the grooming surface 206 to function as a massaging surface for the pet during the grooming process that may be smooth and comfortable on the pet body. Alternatively, and in another embodiment, the grooming surface 206 may be interrupted, whereby the grooming surface 206 may include one or more surface features 208 disposed along a portion of the grooming surface 206 or along an entirety of the grooming surface 206, as described herein. The grooming surface 206 may include a hemispherical portion 212. The hemispherical portion 212 may define the first shell 202. The grooming surface 206 may be configured to contact the pet during the grooming process. The grooming surface 206 may also be disposed in direction generally orthogonal to the elongated portion 226, such as in the example shown in FIG. 9, where the axis (X) of the elongated portion 226 runs at a right angle to the axis (Y) in which the center of the grooming surface 206 projects from the first shell 202.

The surface feature 208 may include the following aspects. The surface feature 208 may be designed to provide functional benefits to the grooming process. As shown in FIGS. 8-17, the surface feature 208 may be a substantially uninterrupted surface 209. Advantageously, the substantially uninterrupted surface 209 may function as a massager for the pet.

Figure 20:
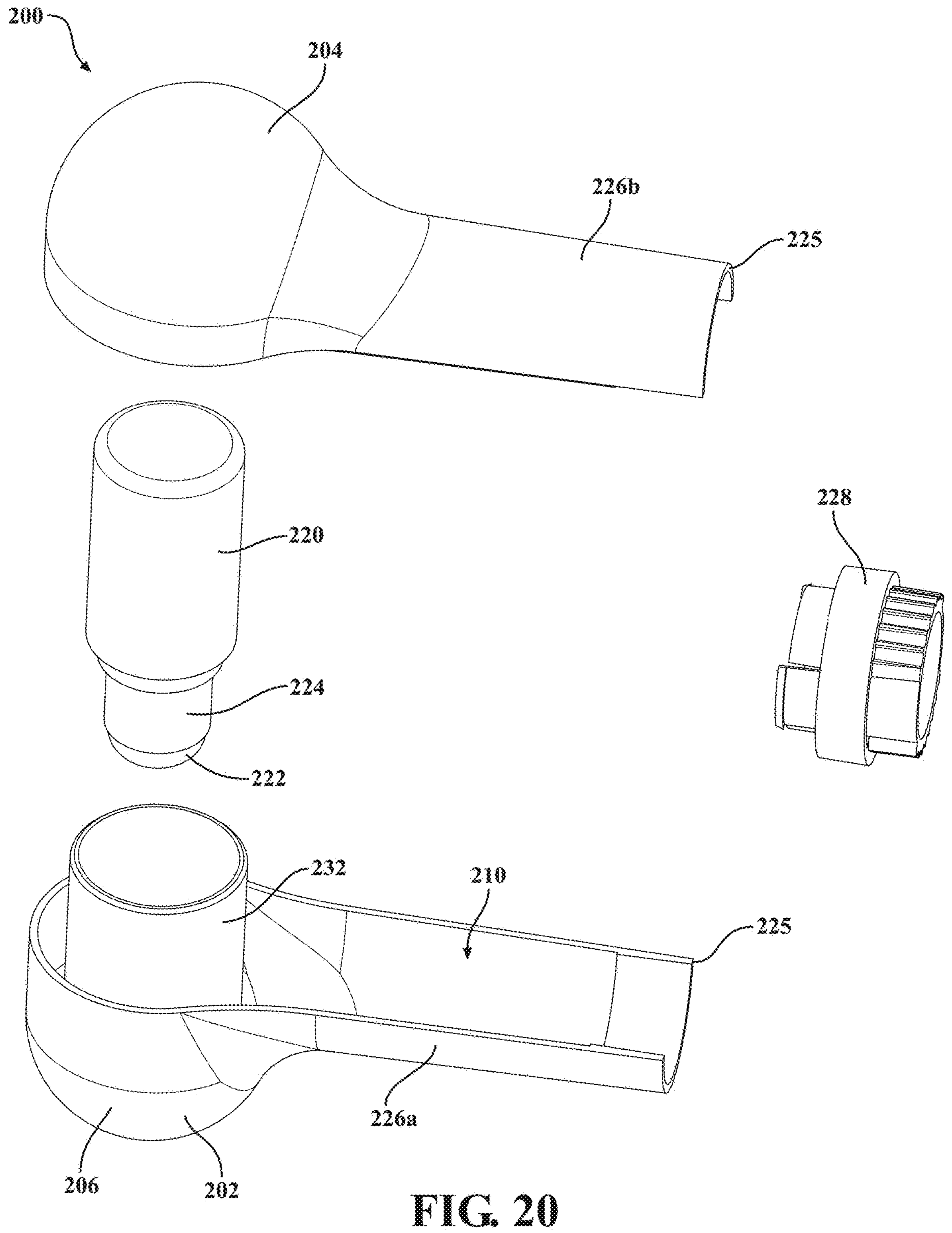
FIG. 20 is an exploded view of the grooming device shown in FIG. 18.
Figure 21:
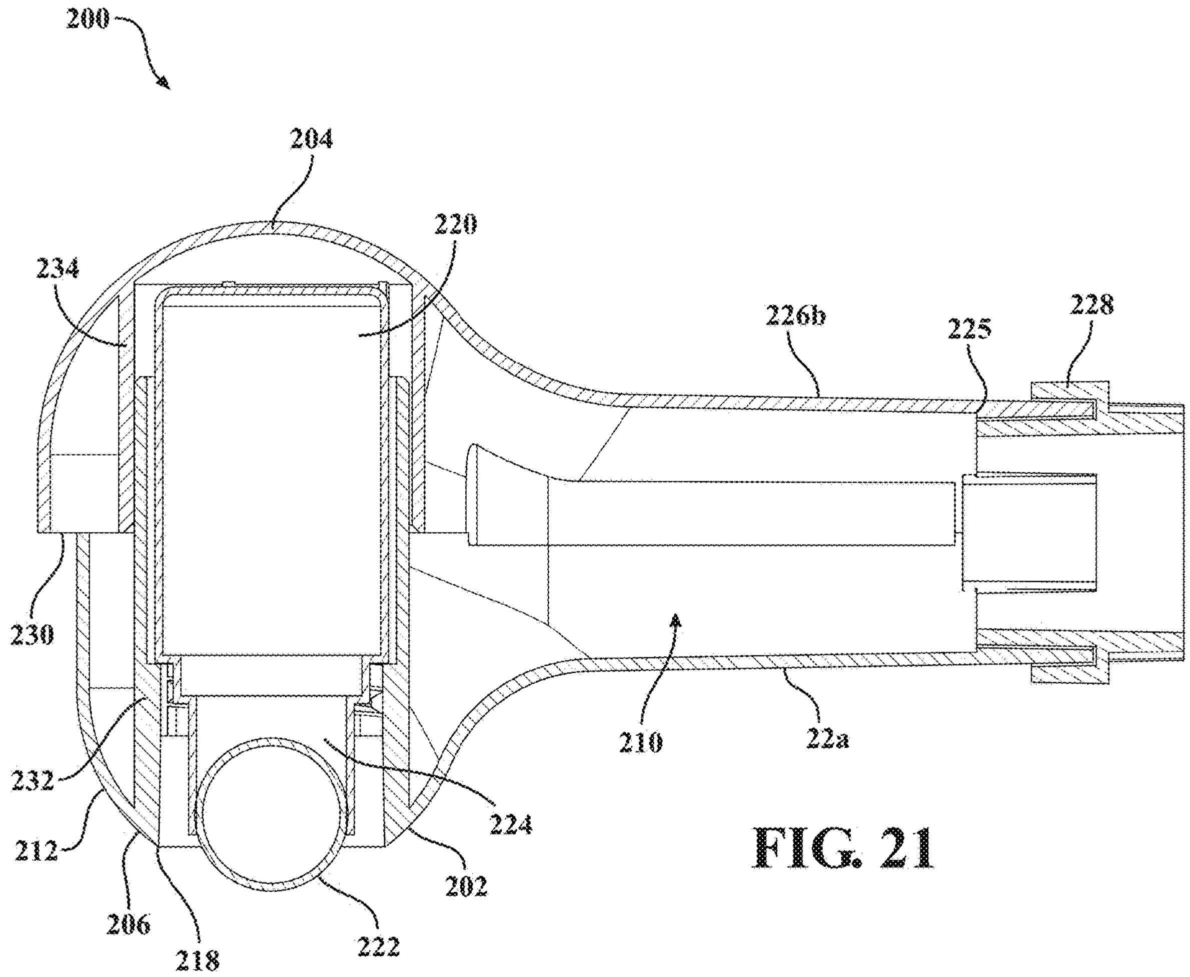
FIG. 21 is a cross sectional view of the grooming device shown in FIG. 18 taken along line C-C.

The surface feature 208 may include a dispensing aperture 218, as shown in FIGS. 18-21. The dispensing aperture 218 may be disposed through the first shell 202. The dispensing aperture 218 may be centrally disposed through the grooming surface 206. Additionally, the dispensing aperture 218 may be centrally disposed relative to a plurality of protrusions 216 such that the plurality of protrusions 216 may circumscribe the dispensing aperture 218, as shown in FIGS. 22-32 and as further described herein. The plurality of protrusions 216 may surround an entirety of the dispensing aperture 218. Alternatively, the plurality of protrusions 216 may partially surround the dispensing aperture 218, including where the plurality of protrusions 216 may surround at least half of the dispensing aperture 218. The dispensing aperture 218 may cooperate with the first interior cylindrical portion 232 of the first shell 202. Specifically, the cartridge 220 may be disposed through the first interior cylindrical portion 232 and the liquid dispensing head 224 of the cartridge 220 may be disposed through the dispensing aperture 218, as shown in FIGS. 20-21. A portion of the cartridge 220 may also be disposed through the second interior cylindrical portion 234 of the second shell 204. Advantageously, the cartridge 220 may be housed within each of the first interior cylindrical portion 232 and the second interior cylindrical portion 234 and may be isolated from the fluid connection of the interior space 210, militating against the suction source and the blowing source from compromising the integrity of the cartridge 220. With reference to FIGS. 18-21, the surface feature 208 may include the dispensing aperture 218 with no other surface features 208.

The dispensing aperture 218 may also be enhanced by varying the size or shape of the dispensing aperture 218 to control the flow rate of the liquid being dispensed. This allows for precise application of a grooming treatment tailored to different grooming needs, whether requiring a fine mist or a more concentrated stream. Moreover, the arrangement of the plurality of protrusions 216 around the dispensing aperture 218 may be designed to be adjustable, enabling users to modify the distribution pattern of the liquid as it exits the aperture. This may be particularly useful for applying treatments to specific areas of a coat of the pet. One of ordinary skill in the art may also select other modifications or enhancements to the dispensing aperture 218 and surrounding features as desired to optimize the dispensing and application of grooming liquids.

With reference to FIGS. 22-31, the grooming device 200 may include various types of surface features 208 based on the type of grooming treatment for the pet. The surface feature 208 may include a plurality of protrusions 216. The plurality of protrusions 216 may be oriented in a direction substantially toward the second shell 204, as shown in FIGS. 24-29.

Figure 30:
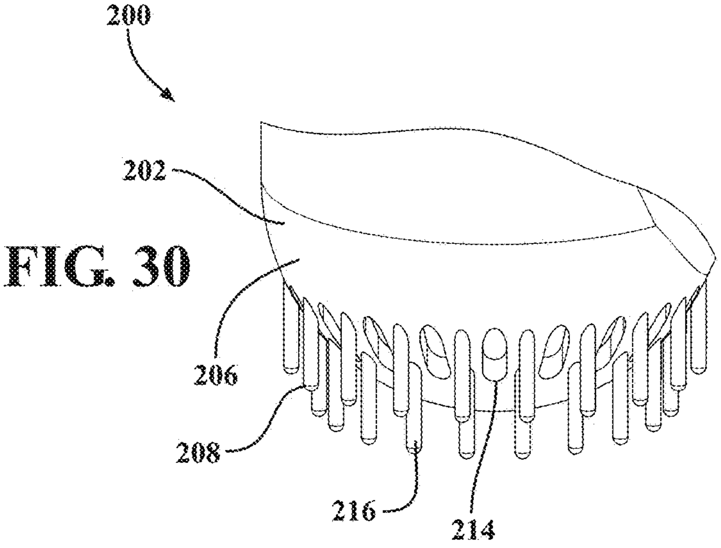
FIGS. 30-31 are partial perspective and bottom plan views of another embodiment of a surface feature on the grooming device.
Figure 31:
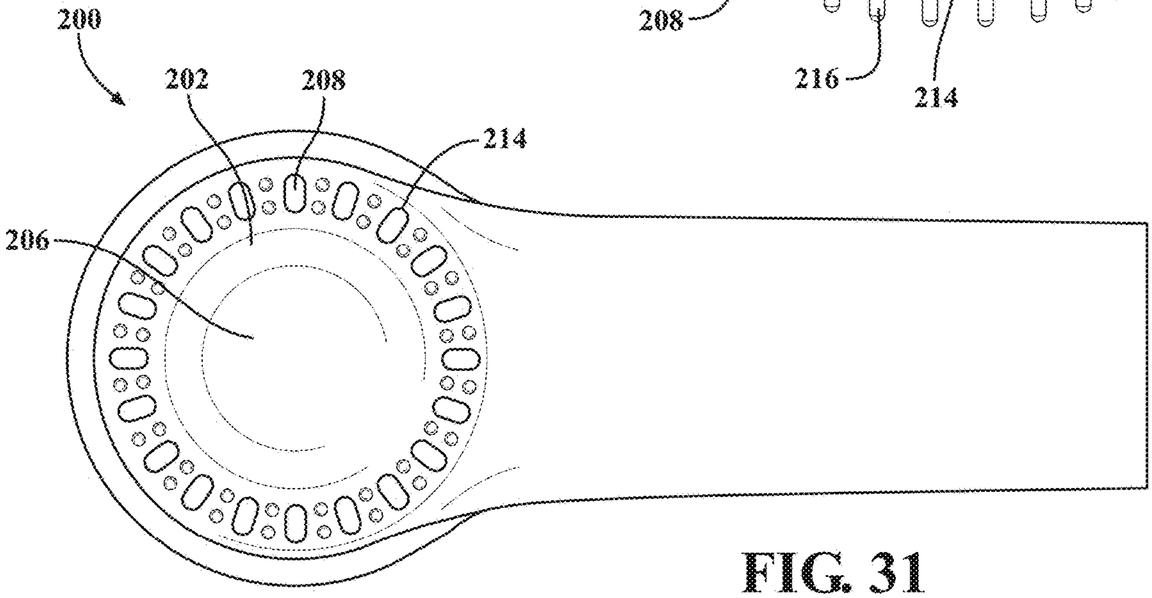

Advantageously, the direction of the plurality of protrusions 216 oriented in a direction substantially toward the second shell 204 allows for a self-cleaning function. The self-cleaning function of the protrusions 216 allows the protrusions 216 to capture shed fur from the pet during the grooming process when the grooming device 200 is moved in one horizontal direction, and the protrusions 216 further direct the shed fur through the gap 230 for suctioning through the elongated portion 226 of the grooming device 200 thereby containing the shed fur when the grooming device 200 is moved in the opposite horizontal direction. Importantly, the protrusions 216 may comb the pet, catch the shed fur, and the trapped hair in the protrusions 216 may be pushed out when the grooming surface 206 is run against the pet in the opposite direction. Desirably, this allows the hair that is caught to be drawn into the gap 230 by the suction source. FIGS. 24-29 show particular embodiments of the plurality of protrusions 216 providing this self-cleaning function. Alternatively, the plurality of protrusions 216 may extend in a direction substantially away from the second shell 204 as shown in FIGS. 30-31. As a non-limiting example, the plurality of protrusions 216 may be bristles, combs, or combinations thereof.

In certain embodiments, the surface feature 208 may have various configurations sufficient to aid in the grooming of the pet. This may include various surface features 208 provided to detangle pet hair, combing pet hair, trimming pet hair, cleaning pet hair, and combinations thereof. For example, as further described herein, the comb-like surface feature may include closely spaced teeth that protrude from the grooming surface 206. Alternatively, the comb-like surface feature may include farther spaced teeth protruding from the grooming surface 206. One of ordinary skill in the art may select a suitable surface feature 208 to dispose on the grooming surface 206 within the scope of the present disclosure.

The surface feature 208 may also include a blade (not pictured) for trimming pet hair. The grooming surface 206 may include an annular blade configured to be disposed on the hemispherical portion 212 of the grooming surface 206 in a manner such that the blade edge may extend along a portion of the grooming surface 206. One of ordinary skill in the art may select a suitable manner and configuration for arranging the blade on the grooming surface 206 within the scope of the present disclosure. Any configuration or location of the blade may be employed in a manner sufficient to trim the pet hair. Specifically, one or more blades may even be positioned and coupled to the grooming surface 206 to trim the pet hair.

Figure 22:
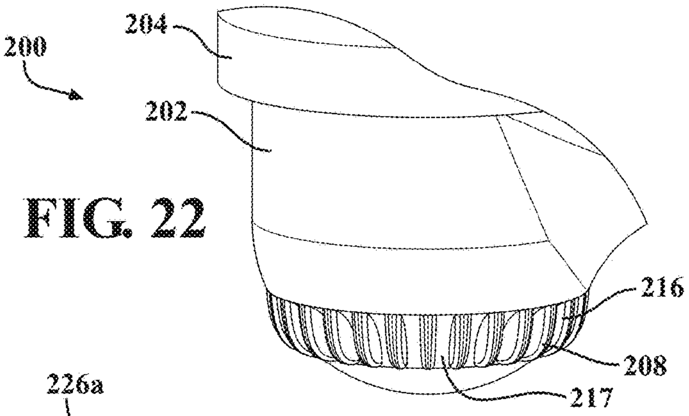
FIGS. 22-23 are partial perspective and bottom plan views of an embodiment of a surface feature on the grooming device.
Figure 23:
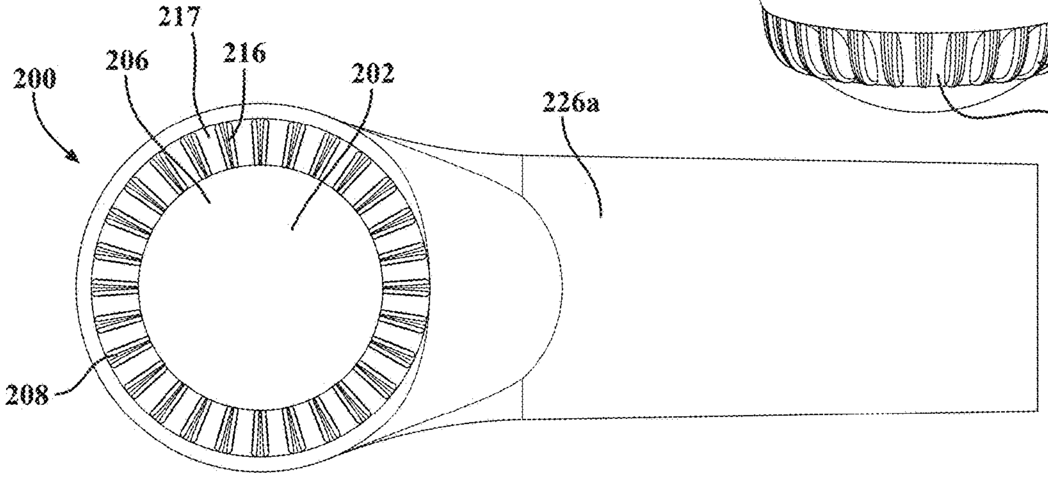

As shown in FIGS. 22-23, the plurality of protrusions 216 may be arranged to create a massaging tool with massaging protrusions. The massaging protrusions may be rigid and substantially curved. The massaging protrusions may be disposed around an entirety of the grooming surface 206. The massaging protrusions may also be disposed around the first shell 202. The massaging protrusions may function as a massager for the pet. Each of the protrusions of the massaging protrusions may be equally spaced apart from one another. The protrusions may further include recesses 217 disposed between each of the protrusions. In particular, the protrusions are spaced apart from one another by the recesses 217. The recesses 217 may be of an equal distance. One of ordinary skill in the art may select a suitable configuration for the recesses 217 and the protrusions for the massaging protrusions in this particular embodiment. In addition, the massaging protrusions may be designed with varying levels of flexibility and different shapes to cater to various types of pet coats and sensitivities. For instance, softer, more flexible protrusions could be used for pets with delicate skin, while firmer, sharper protrusions might be better suited for pets with thicker, matted fur. The spacing between the protrusions may also be adjustable, allowing the user to customize the intensity and coverage of the massage according to the size of the pet and fur type. Materials for these protrusions may be selected based on durability, ease of cleaning, and hypoallergenic properties to ensure safety and comfort for all pets. One of ordinary skill in the art may also select other modifications or enhancements to the massaging protrusions as desired to optimize the grooming experience and effectiveness.

Figure 24:
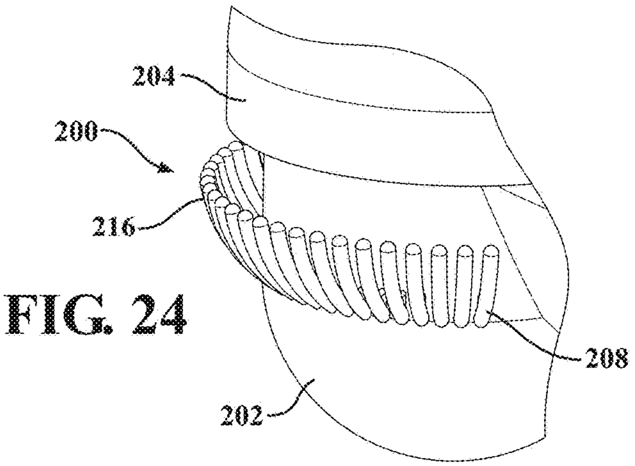
FIGS. 24-25 are partial perspective and bottom plan views of another embodiment of a surface feature on the grooming device.
Figure 25:
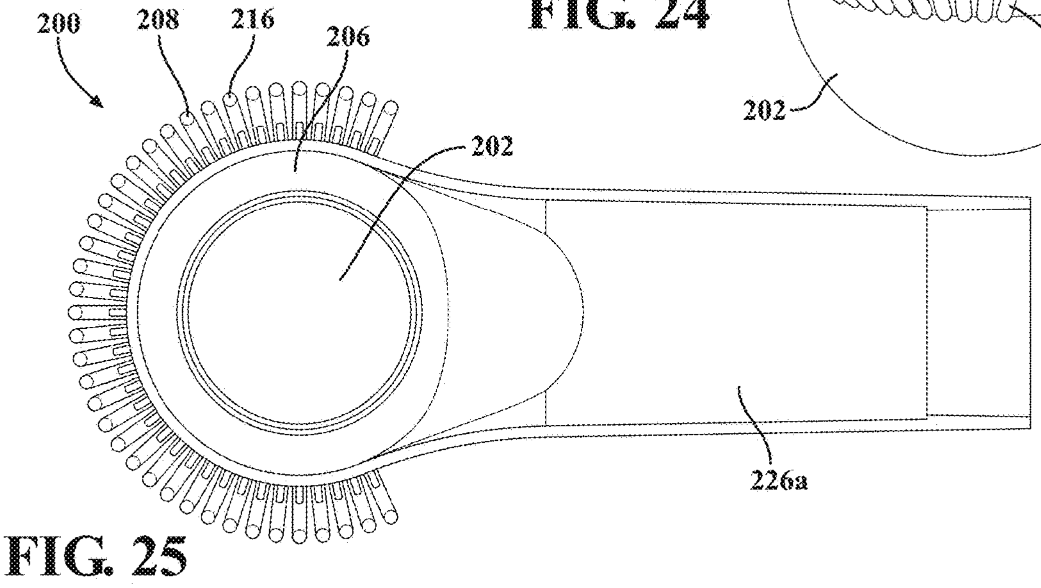

As shown in FIGS. 24-25, the plurality of protrusions 216 may be arranged to create a grooming comb. The grooming comb may include several tines where each tine may have a substantially curved head. The substantially curved head may be configured to contact the pet. The tines may be oriented in a direction substantially toward the second shell 204. More specifically, the substantially curved head of each of the tines may be arranged in a direction toward the second shell 204. Advantageously, the direction of the tines allow the shed fur to be directed to the gap 230 and through the interior space 210. The tines, as shown in FIG. 25, may be disposed along at least half of the grooming surface 206. The tines may be disposed around a portion of the first shell 202. Furthermore, the grooming comb may be enhanced by incorporating tines with adjustable lengths, allowing for customization based on pet fur, as well as the length and density of the pet fur. This flexibility may help in effectively managing different grooming challenges, such as detangling knots or removing undercoat fur. The material of the tines may also vary, with options like silicone for a gentler touch on sensitive skin. Additionally, the orientation and spacing of the tines may be designed to optimize fur capture and minimize discomfort for the pet during grooming. One of ordinary skill in the art may select a suitable configuration for the grooming comb within the scope of the present disclosure.

Figure 26:
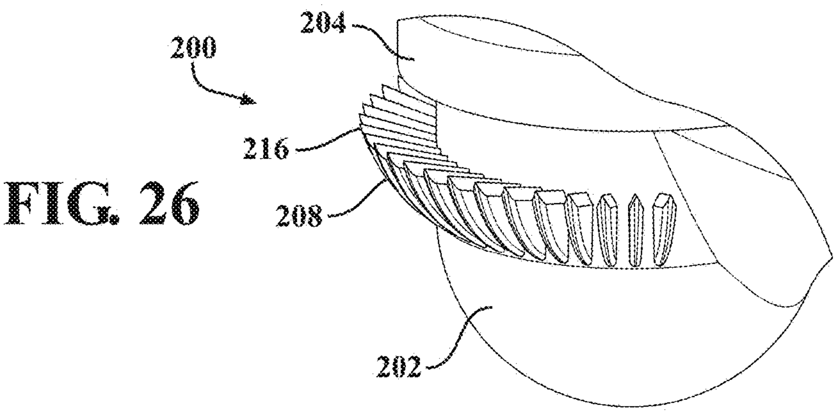
FIGS. 26-27 are partial perspective and bottom plan views of another embodiment of a surface feature on the grooming device.
Figure 27:
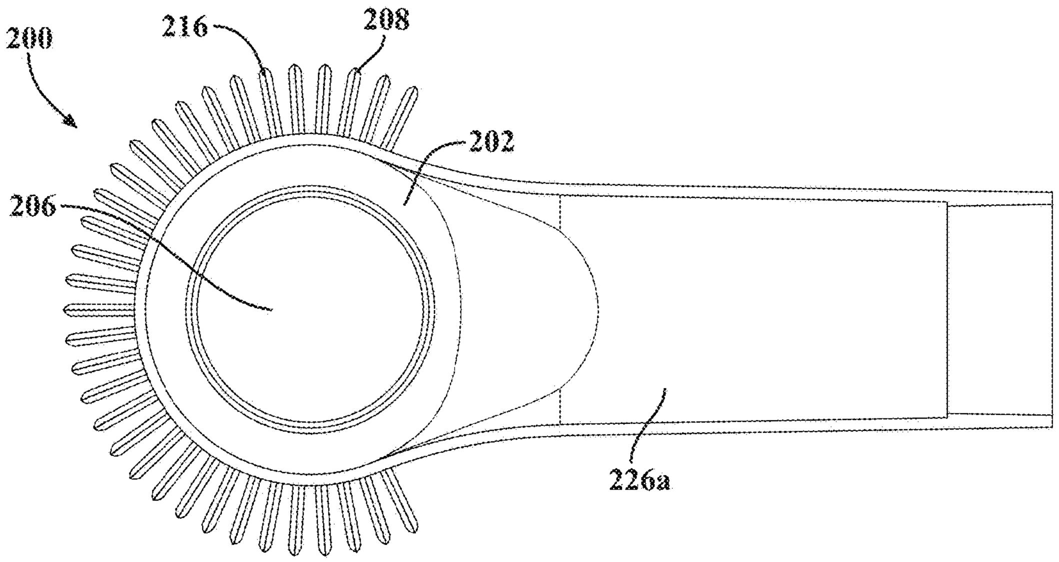

As shown in FIGS. 26-27, the plurality of protrusions 216 may be arranged to create a de-matting comb. The de-matting comb may also include tines with a relatively pointed head. The tines may be oriented in a direction substantially toward the second shell 204 and be point relatively outward and away from the first shell 202. The tines may also be disposed around at least half of the grooming surface 206. Further, the tines may be designed with varying degrees of stiffness and spacing to handle different types of mats and tangles effectively. For example, closer spaced tines may be used for finer fur, while wider spaced tines may be better suited for coarser, thicker fur. Additionally, the tips of the tines may be coated with a protective material to prevent skin irritation, making the grooming process more comfortable for the pet. Materials for the tines and the comb body could be selected for their durability, ease of cleaning, and hypoallergenic properties. One of ordinary skill in the art may also select other modifications or enhancements to the de-matting comb as desired to enhance its functionality and user-friendliness.

Figure 28:
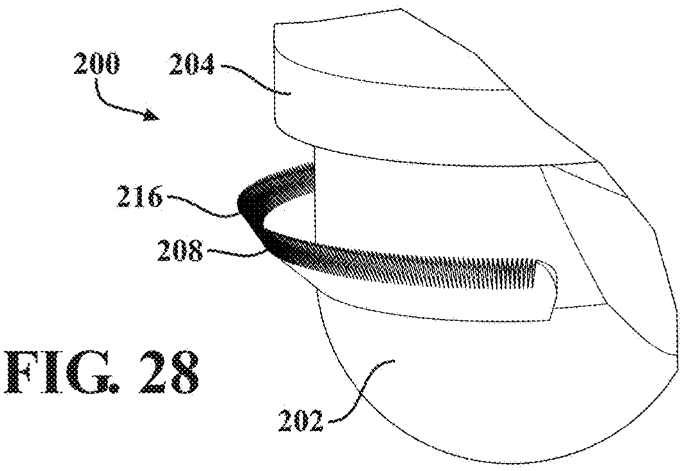
FIGS. 28-29 are partial perspective and bottom plan views of another embodiment of a surface feature on the grooming device.
Figure 29:
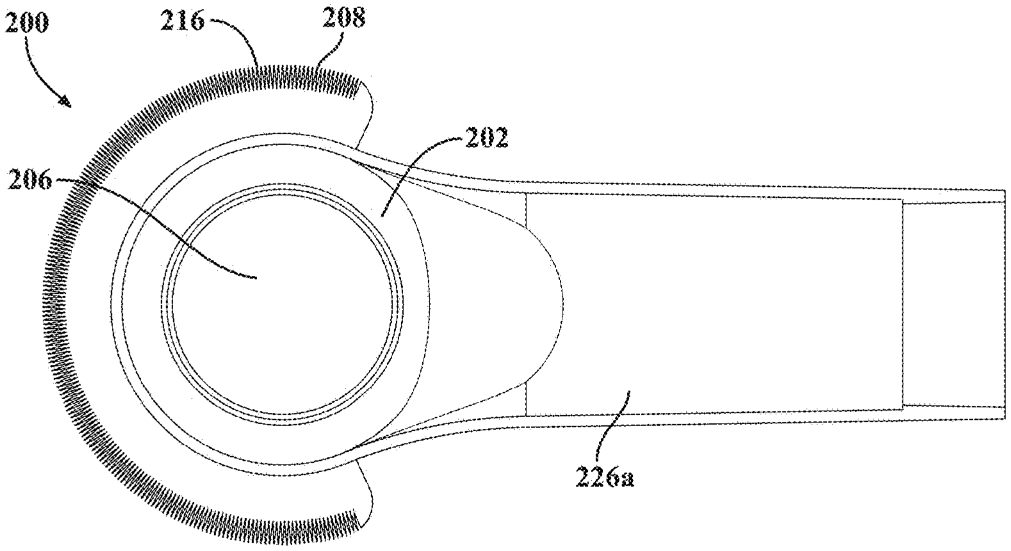

As shown in FIGS. 28-29, the plurality of protrusions 216 may be arranged to create a de-shedding comb. The de-shedding comb may include bristles disposed relatively close to one another forming a brush-like structure. The bristles may be oriented in a direction substantially toward the second shell 204. The bristles may also be disposed around at least half of the grooming surface 206. Importantly, the de-shedding comb directs shed fur to the gap 230 which allows the shed fur to be suctioned through the interior space 210 of the grooming device 200 when coupled to a suctioning source. To further enhance the effectiveness of the de-shedding comb, the bristles may be made adjustable in terms of length and density to cater to different fur types and shedding intensities. This adjustability allows for a more customized grooming experience, ensuring that both light and heavy shedding may be managed efficiently. Additionally, the bristles may be designed with finer tips to provide a more comfortable grooming experience that minimizes irritation to the skin of the pet or may be designed with thicker tips to effectively remove the fur from the pet body. One of ordinary skill in the art may also select other modifications or enhancements to the de-shedding comb as desired to optimize its performance and user-friendliness.

As shown in FIGS. 30-31, the plurality of protrusions 216 may be arranged to form a blowing comb. The blowing comb may include protrusions disposed around an entirety of the grooming surface 206 and further include the plurality of openings 214. The protrusions may be oriented in a direction substantially away from the second shell 204. The protrusions may face away from the second shell 204 and project from the grooming surface 206 of the first shell 202. More specifically, the protrusions 216 may be arranged in a direction substantially toward the pet to massage and groom the pet during use. The protrusions may also be disposed along two rows of protrusions. One of ordinary skill may select a suitable configuration for the protrusions within the scope of the present disclosure.

The plurality of openings 214 may be fluidly coupled to the fluid coupling 228, allowing for enhanced air flow and suction capabilities across the grooming surface 206. Further, the plurality of openings 214 may also function to allow vacuum-induced air flow to enter the grooming device 200 or alternatively exit the grooming device 200. The plurality of openings 214 may further be elongated in a particular embodiment. In certain embodiments, the plurality of openings 214 may include through-holes or slits. One of ordinary skill in the art may select a suitable plurality of openings 214 for the grooming device 200 within the scope of the present disclosure. The plurality of openings 214 may be arranged around the grooming surface 206 along with the plurality of protrusions 216, as shown in FIGS. 30-31. The protrusions may be disposed between the openings. The gap 230 may function to blow air along with the plurality of openings 214 when coupled to the blowing source, further enhancing the grooming treatment for the pet. Additionally, the blowing comb may be enhanced by incorporating variable airflow settings that allow the user to adjust the intensity of the air blown through the plurality of openings 214. This feature may enable a more tailored grooming experience, suitable for different pet sizes, fur types, and sensitivities. The protrusions may also be made with soft, flexible materials to ensure a gentle grooming process, or with firmer materials for more effective detangling and massaging. The arrangement of the protrusions and openings may be optimized to maximize airflow distribution and fur capture, ensuring that the grooming device 200 is as efficient as possible. One of ordinary skill in the art may also select other modifications or enhancements to the blowing comb as desired to further improve its functionality and adaptability to various grooming needs.

Figure 32:
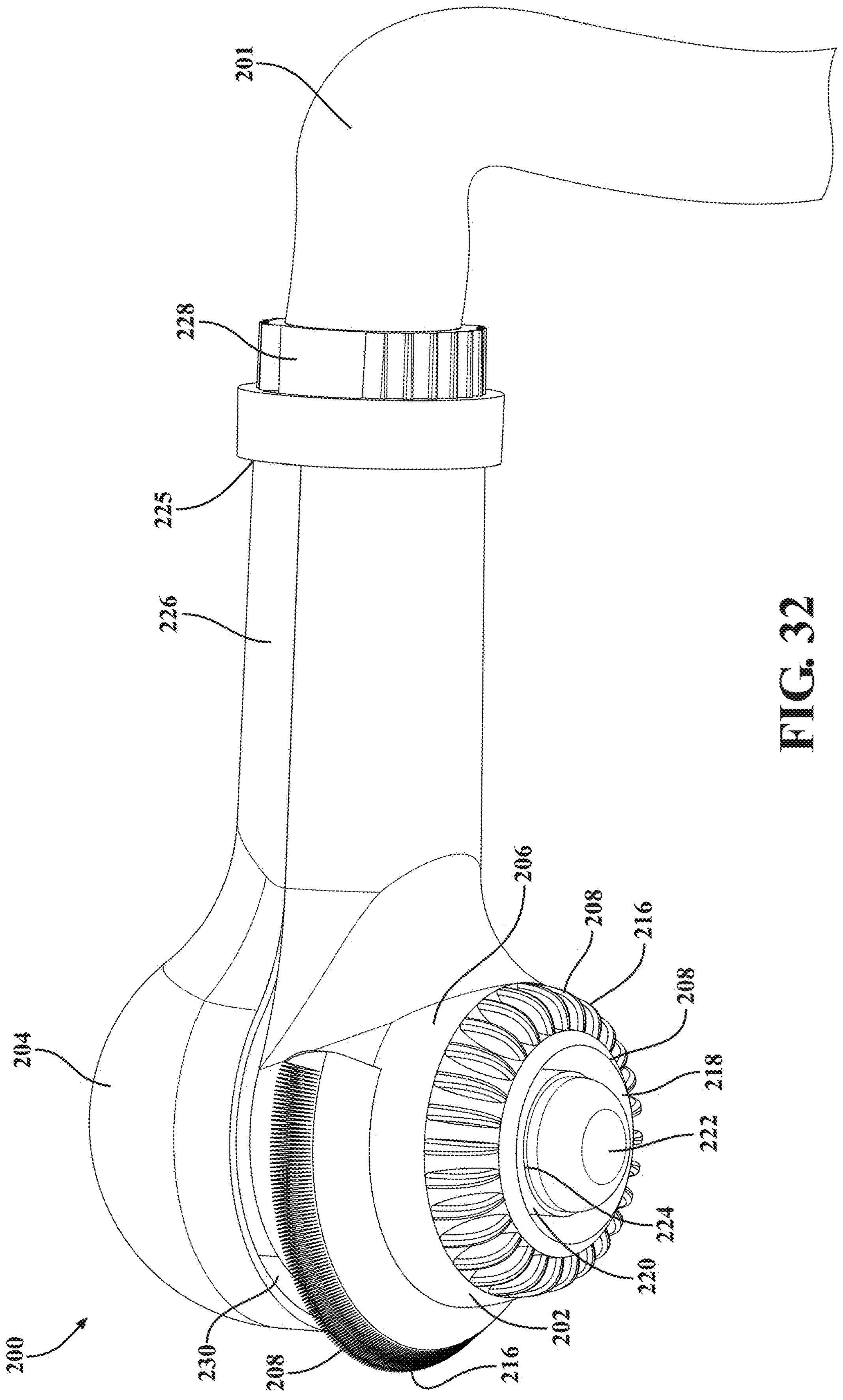
FIG. 32 is an example embodiment of a grooming device, according to another embodiment of the present disclosure.

As shown in FIG. 32, the grooming device 200 may include a combination of the plurality of protrusions 216, the plurality of openings 214, the dispensing aperture 218. More specifically, the user may utilize the grooming device 200 to simultaneously massage the pet using the plurality of protrusions 216 while combing the pet fur/hair and suctioning the fur through the interior space 210, and further applying liquid from a cartridge 220 through the rollerball 222. Advantageously, the grooming device 200, as shown in FIG. 32, may provide a device with a combination of features used to groom, massage, and apply liquid onto the pet in a single, multi-use device.

In certain embodiments, the grooming device 200 may further include a cap (not pictured). The cap may be configured to cover at least a portion of the first shell 202. The cap may be removably coupled to the second shell 204. The cap may be used for storage and may allow the user to keep the surrounding area clean without exposing the grooming surface 206. Advantageously, the cap aids in maintaining the cleanliness of the grooming surface 206 when the grooming device 200 is not in use. With reference to FIG. 10, the second shell 204 may be relatively larger than the first shell 202 to accommodate the first shell 202 and the cap. The cap may be configured to couple to the second shell 204, thereby encompassing the first shell 202 within the cap. One of ordinary skill in the art may select a suitable cap for the grooming device 200 within the scope of the present disclosure.

It should be appreciated that the grooming device 100, 200 may be manufactured from any suitable material by any suitable method sufficient to provide the embodiments as described herein. In particular, the grooming device 100, 200 may include thermoset or thermoplastic materials forming the first shell 102, 202 and the second shell 104, 204. In another example, the grooming device 100, 200 may be manufactured with one or more low or high density polyethylene (LDPE or HDPE) material, polyvinyl-chloride (PVC) material, polyethylene terephthalates (PET) material, polypropylene (PP) material, natural or synthetic rubber, and combinations thereof. In a further embodiment, the grooming device 100, 200 may be formed by injection molding, blow molding, casting, extrusion molding, thermoforming, compression molding, or combinations thereof. One of ordinary skill may select a suitable material and method to manufacture the grooming device 100, 200 within the scope of the present disclosure.

In certain embodiments, the grooming device features a massage head with integrated combs. The grooming device 200 may further include internal combs (not pictured). These combs may be designed to detangle and smooth the pet hair as the device massages the skin. The combs may be configured in various forms such as grooming combs, dematting combs, or de-shedding combs, each tailored to address specific grooming needs. The internal combs may include bristles arranged in a direction substantially toward the second shell 204. The bristles may be arranged toward the second shell 204 to direct pet hair caught between the bristles toward an aperture disposed therethrough the second shell 204. Alternatively, the bristles may be arranged in a direction substantially away from the second shell 204. The bristles may be arranged as an internal ring comb arranged along a perimeter of the first shell 202. The bristles may also be arranged on one side of the grooming surface 206, or along one half of the hemispherical portion 212 of the grooming surface 206. One of ordinary skill in the art may select a suitable configuration for the bristles within the scope of the present disclosure.

In certain embodiments, the grooming device 200 may include a first set of internal combs and a second set of internal combs, each disposed on the grooming surface 206 of the first shell 202. The first set of internal combs may be arranged in a direction substantially toward the second shell 204 and the second set of internal combs may be arranged in a direction substantially away from the second shell 204. What is more, this configuration defines an internal channel between each of the first set of internal combs and the second set of internal combs configured to suction pet hair during the grooming process. Each of the first set of internal combs may be disposed parallel to the second set of internal combs. One of ordinary skill in the art may select a suitable configuration for the first set of internal combs and the second set of internal combs within the scope of the present disclosure.

The grooming device 200 may include a first shell and a second shell configured to be coupled to one another forming an interior space therebetween. In such configurations, the coupling of the first shell with the second shell may result in no gap between the first shell and the second shell. What is more, the first shell may include a first maximum diameter and the second shell may include a second maximum diameter. The first maximum diameter may be equal to the second maximum diameter, ultimately forming no gaps between the coupling of the first shell and the second shell. The first shell may be coupled to one end of the second shell while an elongated body may be coupled to the opposite end of the second shell. The elongated body may also be a handgrip. The elongated body may be tapered, in a certain embodiment. The elongated body may be hollow, and configured to be coupled to an external source such as a suction source or a blowing source. Each of the first shell, the second shell, and the elongated body may be planar to one another. The first shell may also include a grooming surface having a surface feature, as described herein. Combinations of different surface features may be arranged on the grooming surface. Advantageously, the first shell may include an aperture or a plurality of apertures configured to suction shed hair or blow air from the external source through each of the first shell, the second shell, and the elongated body. The first shell may also include a plurality of protrusions in combination with the plurality of apertures. One of ordinary skill in the art may select a suitable combination of surface features to configure on the first shell of this particular embodiment within the scope of the present disclosure.

Each of the first shell, the second shell, and the elongated body may also be disposed on a single (X) axis. For example, in this particular embodiment, the grooming surface is not disposed in a direction generally orthogonal to the elongated body but rather the grooming surface is disposed in a direction generally parallel to the elongated body. Advantageously, this provides a distinct ergonomic design allowing the user to hold the elongated body of the grooming device while keeping the wrist and hand of the user substantially straight and unbent while the grooming surface is in contact with the pet body. One of ordinary skill in the art may select a suitable configuration for the grooming device within the scope of the present disclosure.

In certain embodiments, the grooming device includes a body or handgrip portion, a massage head portion providing a rounded or partially rounded outer massage surface, and at least one vacuum aperture. Such configurations allow the device to be attached to a vacuum hose, enhancing the grooming process by simultaneously massaging the pet and removing loose fur and debris through suction. The design of the handgrip ensures ease of use, while the rounded massage head is gentle on the pet body, making the grooming experience comfortable for the pet.

The grooming device 100, 200 may incorporate a self-cleaning mechanism for the combs which automatically removes fur and debris from the combs during the grooming process, thereby maintaining the effectiveness and hygiene of the device. The self-cleaning mechanism may be particularly beneficial for professional groomers or pet owners with multiple pets, as it reduces the downtime between grooming sessions and ensures that the device is always ready for use. The self-cleaning mechanism may be characterized by bristles arranged around the grooming surface of the first shell such that the bristles may be arranged in a direction substantially toward the second shell, away from the second shell, and combinations thereof.

It should be appreciated that one of ordinary skill in the art may configure the grooming device 100, 200 in any manner as described herein within the scope of the present disclosure. It should further be appreciated that one of ordinary skill in the art may configure the grooming device 100, 200 in any manner described and shown in Applicant's earlier-filed U.S. Provisional Patent Application (U.S. Ser. No. 63/519,860), which was filed on Aug. 16, 2023, and which is incorporated herein by reference. The grooming device 100, 200, and any other configuration of the grooming device may include similar advantages as described herein.

Advantageously, the grooming device 100, 200 may efficiently groom a pet in a single device. The grooming device 100, 200 allows the pet owner to massage a pet while also applying a liquid/oil on the pet body, and further containing the shed fur from the pet. Each feature is designed to contribute to a more effective, efficient, and user-friendly grooming experience, addressing the needs identified in the background of the invention. Desirably, the grooming device 100, 200 integrates these advanced features that significantly enhance the grooming experience for both pets and their owners. The grooming device 200 captures and contains shed fur during the grooming process, reducing environmental cleanliness issues and potential allergic reactions. The grooming device 100, 200 also allows for precise and even application of grooming treatments, overcoming the inefficiencies of conventional methods which often result in uneven distribution and wastage. Furthermore, the ergonomic design of the device minimizes physical strain on the user, addressing the discomfort commonly associated with prolonged grooming sessions. The integration of a liquid applicator with the massaging features allows for a thorough and efficient grooming session, providing both cleaning and massaging in one step, thereby saving time and enhancing the effectiveness of the grooming process. By consolidating multiple functions into a single device, the grooming device 100, 200 simplifies the grooming process, making it more efficient and effective.

Desirably, the grooming device 100, 200 offers the advantage of integrating multiple grooming functions into a single tool. This multifunctionality means that pet owners may massage, detangle, and apply treatments to their pets without the need to switch between different devices. This not only saves time during the grooming process but also reduces the stress on pets by minimizing the duration of the grooming session. Additionally, the convenience of having one tool for multiple purposes simplifies storage and maintenance for the user.

Another advantage of the grooming device 100, 200, is the ergonomic design of both the grooming device 100 and the grooming device 200. The design of the grooming device 100, 200 is provided for comfort and control during use, which may reduce hand fatigue for the user, especially during extended grooming sessions. This feature ensures that the grooming process is as pleasant for the owner as it is for the pet, promoting regular grooming habits that are essential for the pet health and well-being.

The grooming device also features a vacuum attachment, which offers the distinct advantage of simultaneous grooming and cleaning. This feature effectively removes loose fur and dander directly from the pet hair into a vacuum, keeping the surrounding area clean and allergen-free. This is particularly beneficial for pet owners who struggle with allergies or those who wish to maintain a cleaner home environment without compromising on their pet grooming needs. Further, this allows the user to use the grooming device 100, 200 with any vacuum device or external source that user may already have, militating against the need purchasing additional vacuum devices.

Inclusion of a liquid applicator within the grooming device provides an efficient way to evenly distribute grooming treatments such as shampoos, conditioners, or medicinal treatments directly onto the skin and fur of the pet. This ensures that the treatments are more effective, providing better coverage and absorption, which may lead to healthier skin and a more lustrous coat. It also militates against waste of grooming products, which may often occur with manual application.

The grooming device 100, 200 may also be designed with a self-cleaning mechanism for the combs and brushes, offering a significant advantage in terms of hygiene and ease of maintenance. This feature automatically removes trapped fur, dirt, and debris from the device, ensuring that the device remains clean and effective for each use. This not only prolongs the life of the device but also ensures that it is always ready for a hygienic grooming session, which is crucial for the health and comfort of the pet.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A grooming device for a pet, comprising:

a first shell including a grooming surface having a surface feature interrupting the grooming surface, the surface feature configured to contact the pet for grooming; and a second shell configured to be coupled to the first shell to form an interior space therebetween, wherein each of the first shell and the second shell includes an elongated portion extending therefrom, the elongated portion of the first shell coextensive with the elongated portion of the second shell, wherein the combined elongated portions are hollow and are in fluid communication with a portion of the interior space, wherein the combined elongated portions include a fluid coupling at a distal end thereof, the fluid coupling configured to fluidly couple to one of a suction source and a blowing source, wherein the surface feature is arranged around at least half of the grooming surface, wherein coupling of the first shell with the second shell is configured to form a gap surrounding a portion of the first shell, wherein the gap is configured to be fluidly coupled to the fluid coupling through the interior space, wherein the gap is configured as an overhang of the second shell relative to the first shell, wherein the gap is arranged around at least half of the grooming surface, wherein the surface feature includes a plurality of openings, the plurality of openings fluidly coupled to the fluid coupling, and wherein the surface feature further includes a plurality of protrusions, and the plurality of protrusions extends from the grooming surface in a direction substantially toward the second shell.

2. The grooming device of claim 1, wherein the grooming surface includes a hemispherical portion.

3. The grooming device of claim 1, wherein the surface feature is arranged around at least half of the grooming surface.

4. The grooming device of claim 1, wherein the surface feature is arranged around an entirety of the grooming surface.

5. The grooming device of claim 1, wherein the surface feature includes an aperture.

6. The grooming device of claim 1, wherein the surface feature includes a plurality of apertures.

7. The grooming device of claim 1, wherein the surface feature includes a dispensing aperture, the dispensing aperture configured to dispense a liquid.

8. The grooming device of claim 1, wherein the surface feature includes a dispensing aperture, and the grooming device further includes a cartridge configured to dispense a liquid, the cartridge configured to be positioned within the interior space when the second shell is coupled to the first shell.

9. The grooming device of claim 8, wherein the cartridge is configured to release the liquid using a member selected from a group consisting of a rollerball, a dauber, and a pressure-sensitive valve.

10. The grooming device of claim 9, wherein a liquid dispensing head of the cartridge is configured to be disposed in the dispensing aperture.

11. The grooming device of claim 10, wherein the plurality of protrusions circumscribe the dispensing aperture.

12. The grooming device of claim 1, wherein the plurality of openings is arranged around an entirety of the grooming surface of the first shell.

13. The grooming device of claim 1, wherein the first shell includes a first interior cylindrical portion and the second shell includes a second interior cylindrical portion, the first interior cylindrical portion configured to couple to the second interior cylindrical portion when the second shell is coupled to the first shell.

14. The grooming device of claim 13, wherein the surface feature includes a dispensing aperture, and the grooming device further includes a cartridge configured to dispense a liquid, the cartridge configured to be positioned within the interior space when the second shell is coupled to the first shell, the first interior cylindrical portion configured to hold a portion of the cartridge.

15. The grooming device of claim 14, wherein the second interior cylindrical portion is configured to hold another portion of the cartridge.

16. The grooming device of claim 1, wherein:

the grooming surface includes a hemispherical portion;

the surface feature includes a dispensing aperture;

the grooming device includes a cartridge configured to dispense a liquid, the cartridge configured to be positioned within the interior space when the second shell is coupled to the first shell;

the cartridge is configured to release the liquid using a member selected from a group consisting of a rollerball, a dauber, and a pressure-sensitive valve;

a liquid dispensing head of the cartridge is configured to be disposed in the dispensing aperture;

the plurality of protrusions circumscribe the dispensing aperture;

the dispensing aperture is centrally disposed in the grooming surface;

the grooming device includes a cap configured to cover at least a portion of the first shell; and the cap is configured to be removably coupled to the second shell, thereby disposing the first shell within the cap.

17. The grooming device of claim 1, wherein:

the grooming surface includes a hemispherical portion;

the first shell includes a first interior cylindrical portion and the second shell includes a second interior cylindrical portion, the first interior cylindrical portion configured to couple to the second interior cylindrical portion when the second shell is coupled to the first shell; and the first interior cylindrical portion is configured to be received by the second interior cylindrical portion of the second shell.

18. The grooming device of claim 1, wherein:

the grooming surface includes a hemispherical portion;

the first shell includes a first interior cylindrical portion and the second shell includes a second interior cylindrical portion, the first interior cylindrical portion configured to couple to the second interior cylindrical portion when the second shell is coupled to the first shell;

the first interior cylindrical portion is configured to be received by the second interior cylindrical portion of the second shell;

the surface feature includes a dispensing aperture, and the grooming device further includes a cartridge configured to dispense a liquid, the cartridge configured to be positioned within the interior space when the second shell is coupled to the first shell, the first interior cylindrical portion configured to hold a portion of the cartridge; and the second interior cylindrical portion is configured to hold another portion of the cartridge.

* * * * *